United States Patent
Bailey et al.

(10) Patent No.: US 9,317,545 B2
(45) Date of Patent: *Apr. 19, 2016

(54) TRANSACTIONAL REPLICATION

(71) Applicant: Infoblox Inc., Santa Clara, CA (US)

(72) Inventors: Stuart M. Bailey, San Jose, CA (US); Ivan W. Pulleyn, Sunnyvale, CA (US); Srinath Gutti, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/955,487

(22) Filed: Jul. 31, 2013

(65) Prior Publication Data

US 2014/0019428 A1 Jan. 16, 2014

Related U.S. Application Data

(63) Continuation of application No. 11/232,418, filed on Sep. 21, 2005, now Pat. No. 8,533,169.

(51) Int. Cl.
*G06F 17/30* (2006.01)

(52) U.S. Cl.
CPC .... *G06F 17/30309* (2013.01); *G06F 17/30575* (2013.01); *G06F 17/30923* (2013.01)

(58) Field of Classification Search
CPC ................................................ G06F 17/30309
USPC ................ 707/610, 640, 661, 674, 688–690, 707/692–697, 700–704, 999.201–999.204; 709/203; 714/738, 735, 726, 732, 2
See application file for complete search history.

(56) References Cited

U.S. PATENT DOCUMENTS

| | | | |
|---|---|---|---|
| 5,499,367 A * | 3/1996 | Bamford et al. | |
| 6,367,029 B1 * | 4/2002 | Mayhead et al. | 714/2 |
| 7,054,924 B1 | 5/2006 | Harvey et al. | |
| 7,120,690 B1 | 10/2006 | Krishnan et al. | |
| 7,269,648 B1 | 9/2007 | Krishnan et al. | |
| 7,657,582 B1 | 2/2010 | Cram et al. | |
| 7,730,180 B1 | 6/2010 | Krishnan et al. | |
| 7,769,722 B1 | 8/2010 | Bergant et al. | |
| 7,809,691 B1 | 10/2010 | Karmarkar et al. | |
| 8,027,958 B1 | 9/2011 | Chapman | |
| 8,082,232 B2 | 12/2011 | Okada et al. | |
| 8,095,511 B2 | 1/2012 | Zwilling et al. | |
| 8,121,981 B2 | 2/2012 | Simek et al. | |
| 8,200,638 B1 | 6/2012 | Zheng et al. | |
| 8,527,462 B1 | 9/2013 | Talius et al. | |
| 2002/0165961 A1 | 11/2002 | Everdell et al. | |
| 2003/0182325 A1 | 9/2003 | Manley et al. | |
| 2005/0015416 A1 | 1/2005 | Yamagami | |
| 2005/0125430 A1 * | 6/2005 | Souder et al. | 707/100 |

(Continued)

OTHER PUBLICATIONS

Gray et al., The Dangers of Replication and a Solution, Sigmod '96, Montreal Canada, Jun. 1996.

*Primary Examiner* — Syling Yen
(74) *Attorney, Agent, or Firm* — Van Pelt, Yi & James LLP

(57) ABSTRACT

Writing data in a distributed database having a plurality of nodes is disclosed. Writing includes receiving a write request at a node, wherein the write request is associated with one or more operations to define an atomic transaction and performing the atomic transaction based on the request. The atomic transaction includes writing to a first version of the database in the node and writing to an entity representative of a state of the first version of the database.

30 Claims, 37 Drawing Sheets

(56) References Cited

U.S. PATENT DOCUMENTS

| | | |
|---|---|---|
| 2005/0262097 A1 | 11/2005 | Sim-Tang et al. |
| 2006/0112219 A1 | 5/2006 | Chawla et al. |
| 2010/0145909 A1 | 6/2010 | Ngo |
| 2010/0257142 A1 | 10/2010 | Murphy et al. |
| 2012/0011176 A1 | 1/2012 | Aizman |
| 2012/0131567 A1 | 5/2012 | Barros et al. |
| 2012/0317074 A1 | 12/2012 | Ngo |
| 2013/0117237 A1 | 5/2013 | Thomsen et al. |
| 2013/0124798 A1 | 5/2013 | Aszmann et al. |

* cited by examiner

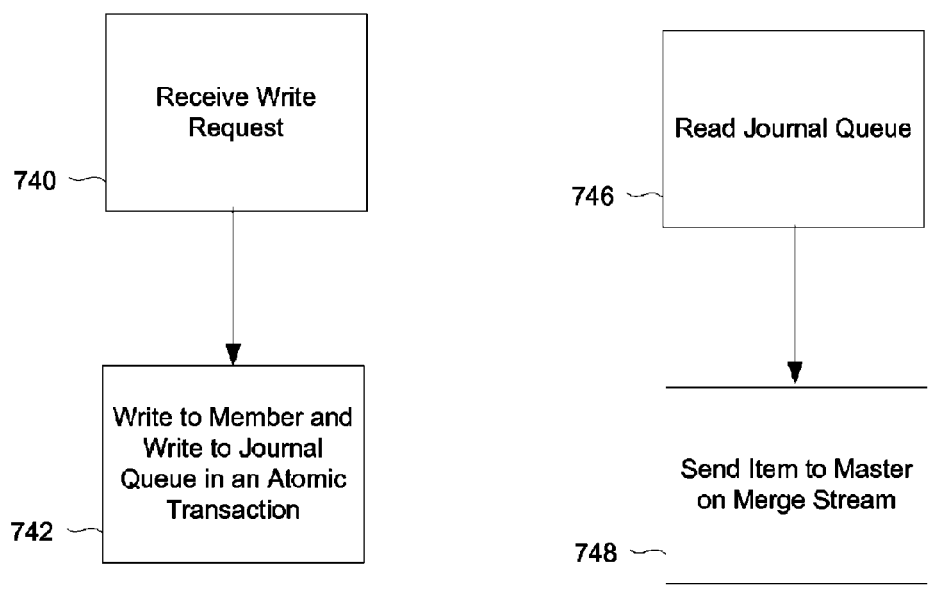

TRANSACTIONAL REPLICATION

CROSS REFERENCE TO OTHER APPLICATIONS

This application is a continuation of co-pending U.S. patent application Ser. No. 11/232,418, entitled TRANSACTIONAL REPLICATION filed Sep. 21, 2005 which is incorporated herein by reference for all purposes

BACKGROUND OF THE INVENTION

A distributed database is a database in which portions of the database are stored on more than one computer within a network. A local application or user has read access to the portion of the database at that location. To keep the various locations synchronized, writes (e.g., inserts, updates, and deletes) to the database are typically replicated between the various locations, as applicable. A typical distributed database is either centralized or partitioned.

FIG. 1A is a diagram illustrating a centralized distributed database system 100. System 100 is shown to include master 102 and members 104, 106, and 108. Reads can be performed at any node. For example, each node maintains a read only cache. Writes must be performed through master 102. Write requests are sent to master 102, and the database in master 102 is updated. The data is replicated to the members by propagating the changed data (e.g., changed columns and/or rows) to each of members 104, 106, and 108. Each member receives the data and places it in its cache (or local version of the database). This approach can be bandwidth intensive when a large amount of data needs to be propagated. For example, if 5 million records with "infoblox.com" need to be changed to "infoblox.xyz.com", those 5 million changed records would need to be shipped. A centralized database is difficult to scale. All changed data is transmitted, which can consume high bandwidth and can overwhelm the system. All writes must go through the master, which increases latency, particularly in a highly distributed system. In addition, the master can become a bottleneck.

FIG. 1B is a diagram illustrating a partitioned distributed database system 120. System 120 is partitioned into three portions each with a local master and members. Each master has full write authority for that partition. However, writes to each partition are generally not coordinated. For example, a host name may be added to partition 140 that may already exist in partition 122, resulting in inconsistent data between the two partitions. Some sort of coordination between each partition is needed if such inconsistencies are to be avoided. If a single overall master is selected, that master could become a bottleneck since it would need to approve all transactions. It would be desirable to have a faster and more scalable distributed database.

In addition, a member can comprise a high availability (HA) pair, or an active node and a passive (or redundant) node, where the passive node serves as a backup to the active node in case of failure. Currently data is not reliably consistent between the active and the passive nodes. Thus, if there is a failure of one node, there can be a loss of data. It would therefore also be desirable to have a more reliable distributed database.

BRIEF DESCRIPTION OF THE DRAWINGS

Various embodiments of the invention are disclosed in the following detailed description and the accompanying drawings.

FIG. 7B is a flowchart illustrating a method of provisionally writing data in a distributed database at a member FIG. 7C is a flowchart illustrating a process for propagating an item from a journal queue to a master.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Provisionally writing data in a distributed database is disclosed. A write request is received at a member and the write is applied to the member without the need to consult a master. The write request is later propagated to the master for reconciliation. In some embodiments, the write is placed in a journal queue of items for propagating to the master. The write to the member database and to the journal queue are performed as a single atomic transaction. If the member is an HA pair, the write is performed to both nodes of the HA pair as a single atomic transaction.

Figure 2A:
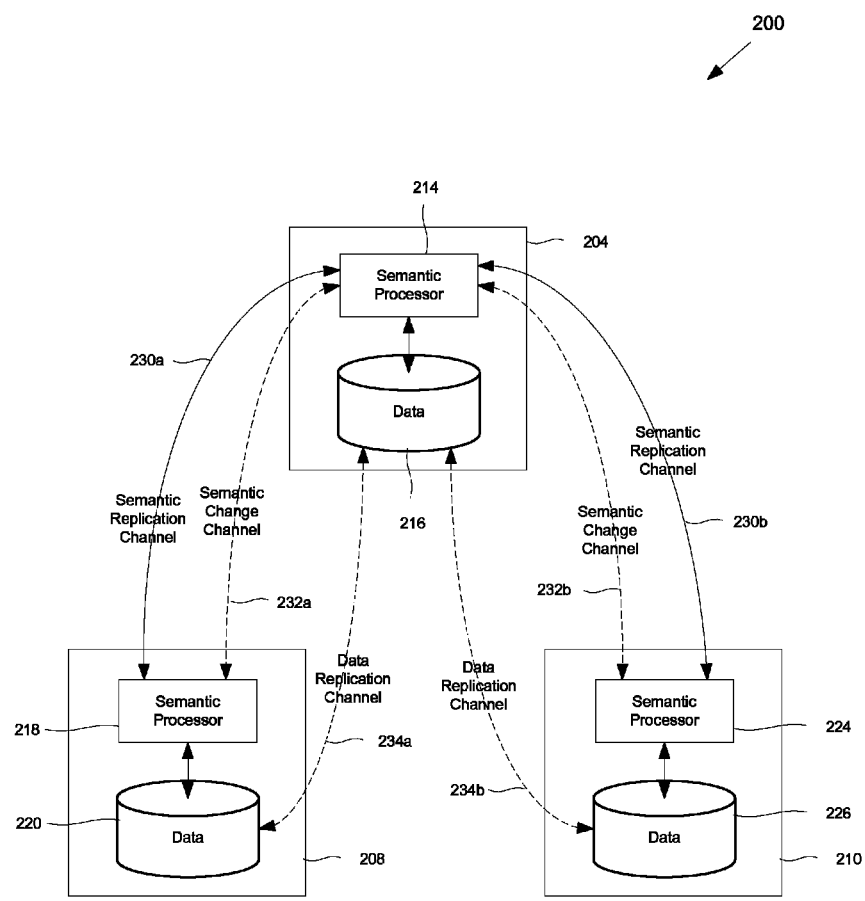
FIG. 2A is a diagram of a system for performing semantic replication. In this example, system 200 is a distributed database.

FIG. 2A is a diagram of a system for performing semantic replication. In this example, system 200 is a distributed database. For example, the distributed database may provide a network identity service, such as DNS, DHCP, RADIUS, or LDAP. System 200 is shown to include master 204 and two members 208 and 210. Any number of members may be included in other embodiments. Each of master 204 and members 208 and 210 may reside on a computer, appliance, or any other appropriate device. Master 204 and members 208 and 210 may be physically co-located or separated. Master 204 is shown to include semantic processor 214 and a master version of the database 216. Member 208 is shown to include semantic processor 218 and a local version of the database 220. Member 210 is shown to include semantic processor 224 and a local version of the database 226 (or local database 226).

In some embodiments, the semantic processor is considered part of the local database. Semantic processors 214, 218, and 224 communicate over a semantic replication channel (SRC) 230a and 230b and a semantic change channel (SCC) 232a and 232b as shown. Databases 216, 220, and 226 may communicate over a data replication channel (DRC) 234a and 234b. A database change request is received at master 204. A database change (or database write) request is a request that modifies the database in any way when executed. The write request may be expressed as a command, instruction, function, query or operation. For example the change may be an operation such as insert, update, or delete. Semantic processor 214 interprets the change and applies the change to database 216. The change is propagated to semantic processors 218 and 224 over SCC 230a and 230b, respectively. Semantic processors 218 and 224 interpret the change and apply the change to databases 220 and 226, respectively.

In some embodiments, the change is expressed as a semantic command that is one of a predefined set of commands. A semantic command, as used herein, is a write request expressed semantically. The semantic command can be defined by operations, instructions, other semantic commands, or in any other appropriate way. In some embodiments, the semantic command is defined by one or more operations. Semantic commands may be described in a markup language, such as XML. In one embodiment, the semantic commands are specified in RTXML, as described below and in U.S. patent application Ser. No. 10/950,357 entitled MARKUP LANGUAGE SPECIFICATION OF A DATABASE SCHEMA, which is incorporated herein by reference for all purposes. In some embodiments, the data (e.g., objects) in the database is described in a markup language such as XML (e.g., RTXML) and semantic processors 214, 218, and 224 each include an XML engine or interpreter.

In this example, databases 216, 220, and 226 each have the same version of data. In one embodiment, the data in each of the databases is expressed in the same version of RTXML. Semantic processors 214, 218, and 224 are each capable of interpreting the same set of commands within a group of semantic processors. For example, the commands are expressed in the same version of RTXML. Individual processors may interpret commands differently. Different interpretations of the semantic processors can be reconciled. In some embodiments, a map of semantic interpretation and members is maintained.

A system upgrade may be performed where the semantic processors 214, 218, and 224 and databases 216, 220, and 226 are upgraded. In some embodiments, first the master is migrated. For example, database 216 is migrated and semantic processor 214 is upgraded. In one embodiment, database 216 is migrated as described below and in U.S. patent application Ser. No. 10/950,192 entitled DATABASE MIGRATION, which is incorporated herein by reference for all purposes. The new version of database 216 is then replicated over data replication channel 234a and 234b to databases 220 and 226. Semantic processors 218 and 224 are upgraded over semantic change channels 232a and 232b. In some embodiments, each of nodes 204, 208, and 210 is independently migrated. For example, database 220 and database 226 are each migrated using MDXML.

Figure 2B:
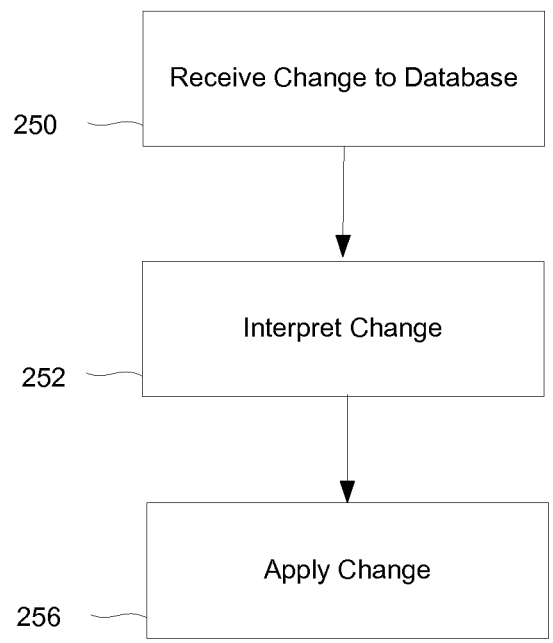
FIG. 2B is a flowchart illustrating a method of performing semantic replication. In this example, a database change is received at a node (250).

FIG. 2B is a flowchart illustrating a method of performing semantic replication. In this example, a database change is received at a node (250). For example, the node could be master 204, member 208, or member 210 in FIG. 2A. The change may be expressed as a semantic command, as described above. For example, the command could be defined by one or more database operations. The change is interpreted (252). For example, one or more operations that can be used to implement the change are determined. In some embodiments, a semantic processor determines one or more database operations that can be used to execute a semantic command. The change is applied (256). For example, the semantic processor could apply one or more database operations to the local database.

The node may either be the master or a member. When the node is a master, the change may originate at the master or at a member. For example, the change can be received at a member and sent to the master. The change can be received directly at the master. For example, an application running on the master requests the change.

When the node is a member, the change may originate at a master, another member, or the same member. For example, the change can be received at the master, applied to the database on the master, and sent to the member. The change can be received at another node, propagated to the master, applied to the master, and sent to the member. The change can be received at the member, sent to the master, applied to the master, and sent back to the member. In this case, the change can be applied to the member the first or second time the change is received. For example, the change can be applied to the member before forwarding it to the master. Later, the change is sent to the master for reconciliation with the database on the master. In this case, the member has provisional write authority, as more fully described below. In some embodiments, each member is an HA pair including an active node and a passive node. The change is applied to the HA pair as a single atomic transaction, as more fully described below.

In some embodiments, changes may be interpreted differently by different processors. Different semantic interpretations may be captured in a markup language description, such as RTXML, as described below and in U.S. patent application Ser. No. 10/950,357 entitled MARKUP LANGUAGE SPECIFICATION OF A DATABASE SCHEMA, which was previously incorporated by reference. In this example, semantics refers to application semantics. Application specific semantics in the database can be captured and applied in an efficient way.

Figure 2C:
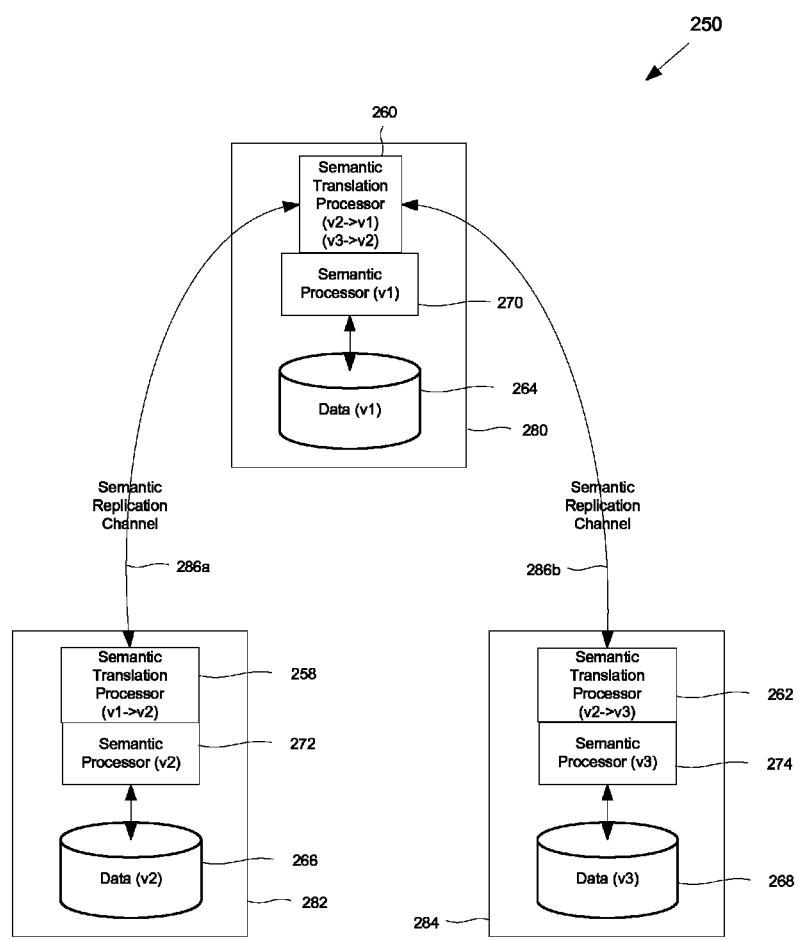
FIG. 2C is a diagram of a system for performing semantic replication where one or more nodes have different database semantics.

FIG. 2C is a diagram of a system for performing semantic replication where one or more nodes have different database semantics. System 250 is shown to include master 280 and two members 282 and 284. Any number of members may be included in other embodiments. Master 280 is shown to include semantic translation processor 260, semantic processor 270 and a master version of the database 264. Member 282 is shown to include semantic translation processor 258, semantic processor 272 and a local version of the database 266. Member 284 is shown to include semantic translation processor 262, semantic processor 262 and a local version of the database 268. In some embodiments, the semantic processor is considered part of the local database. Semantic translation processors 260, 258, and 262 communicate over a semantic replication channel (SRC) 286a and 286b.

In this example, each of databases 264, 266 and 268 express data using different semantics. Also, each semantic processor is capable of interpreting a different set of (semantic) commands. Thus, each semantic processor is different. In some embodiments, each database expresses data in a different version of RTXML and each semantic processor understands commands from a different version of RTXML. In this example, semantic processor 270 and database 264 use version 1, semantic processor 272 and database 266 use version 2, and semantic processor 274 and database 268 use version 3.

The semantic translation processor is connected between the semantic processor and the semantic replication channel. The semantic translation processor translates semantic commands so that they can be processed by a local semantic processor. For example, on node 284, semantic processor 274 includes an ability to translate a semantic command from node 280 to a semantic command that can be processed by semantic processor 274. Similarly, semantic processor 272 includes an ability to translate a semantic command from node 280 to a semantic command that can be processed by semantic processor 272. On node 280, semantic processor 260 includes an ability to translate a semantic command (e.g., sent over SRC 286a) from node 282 to a semantic command that can be processed by semantic processor 270. Semantic processor 260 also includes an ability to translate a semantic command (e.g., sent over SRC 286b) from node 284 to a semantic command that can be processed by semantic processor 270.

For example, a database change may be received at master 280. The change is expressed in version 1 (e.g., of RTXML). Semantic processor 270 interprets the change and applies the change to database 264. The change is propagated to members 282 and 284. Semantic translation processors 258 and 262 receive the change and translate the change to a locally understood semantic command. For example, semantic translation processor 258 translates the change so that it is expressed in version 2. In some embodiments, the translation is described in a markup language, such as XML. In some embodiments, the translation is performed using MDXML, as described below and in U.S. patent application Ser. No. 10/950,184 entitled MULTIVERSION DATABASE CLUSTER MANAGEMENT, which is incorporated herein by reference for all purposes. Semantic processors 272 and 274 interpret the change and apply the change to databases 266 and 268, respectively.

Figure 3A:
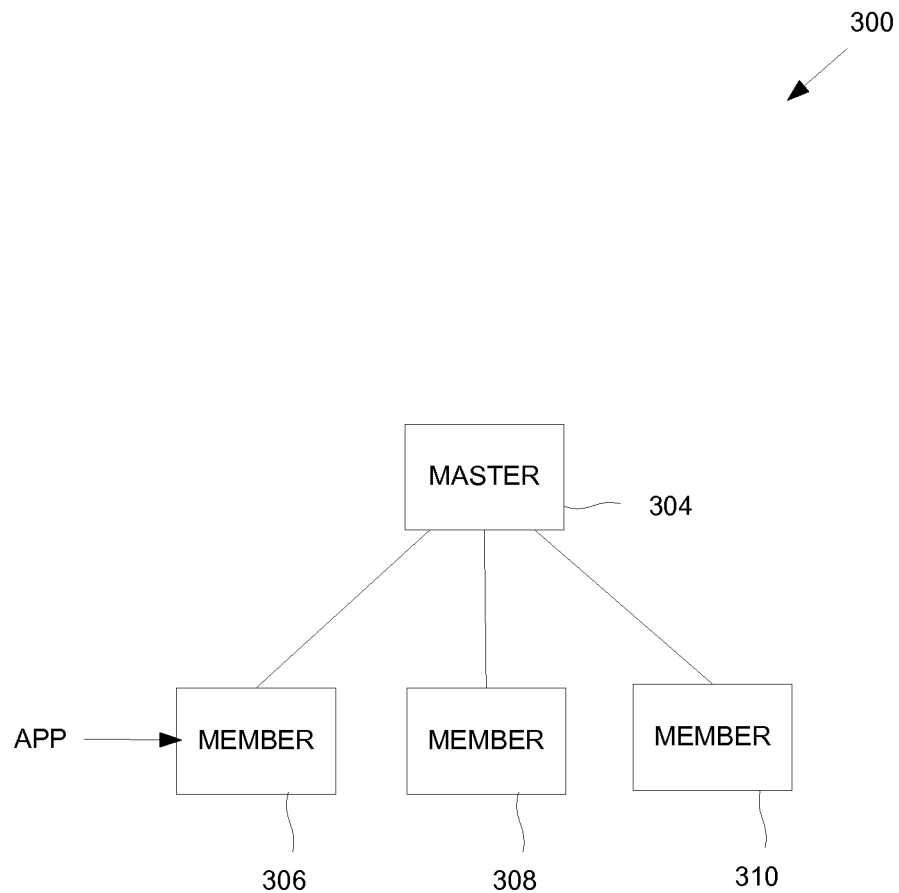
FIG. 3A is a diagram illustrating a system for provisionally writing data in a distributed database

FIG. 3A is a diagram illustrating a system for provisionally writing data in a distributed database. In this example, system 300 is shown to include master 304 and members 306, 308, and 310. Each of members 306, 308, and 310 has provisional write authority. In other words, a write request received at any one of members 306, 308, and 310 can be applied to a local database before the change is propagated to master 304. The master gives a "contract" to the member to write to its local database without having to consult the master. The contract gives permission (or authority) to write to a space under the condition that the write is reconciled with the master database in the future.

More than one member can have authority to write to the same space (e.g., the whole or a portion of the database). In this example, a contract to write to the same space has been given to both members 306 and 308. A conflict can occur when both members 306 and 308 provisionally write to the same record. The conflict may be a data consistency or application logic conflict. For example, a conflict occurs when member 306 deletes a record and member 308 writes to the record. The conflict is discovered when the delete and write are propagated to the master. The conflict may be resolved according to a policy. For example, the master may ignore the write. Member 308 is notified and responds to the conflict as appropriate. For example, the member may back out the write. Further examples are provided below.

Figure 3B:
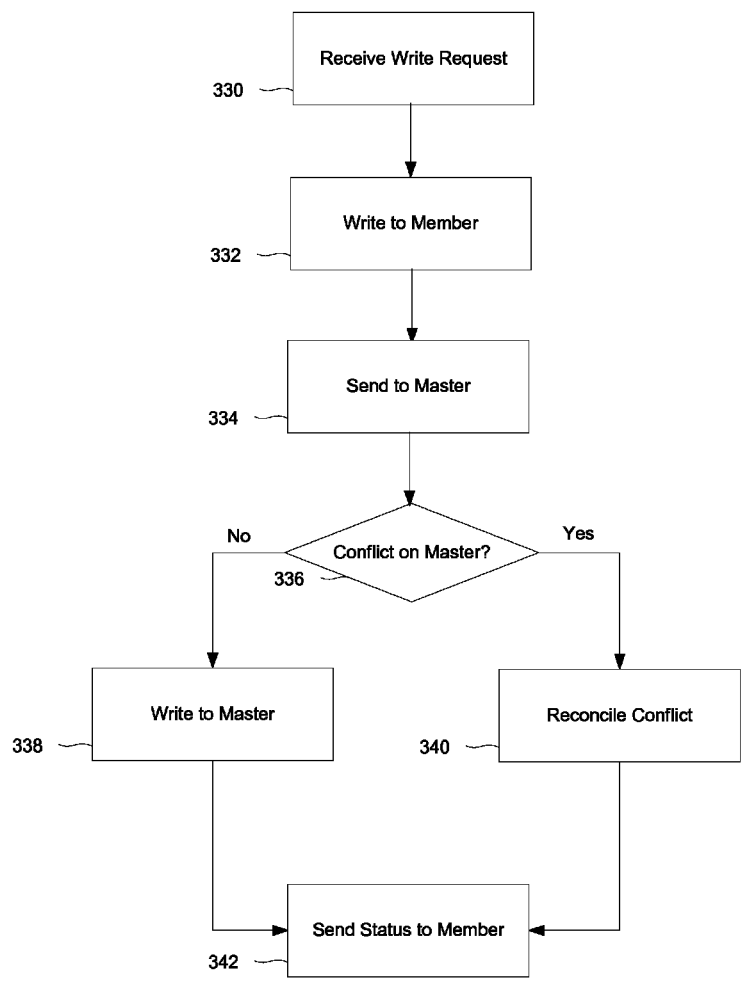
FIG. 3B is a flowchart illustrating a method of provisionally writing data in a distributed database.

FIG. 3B is a flowchart illustrating a method of provisionally writing data in a distributed database. In some embodiments, this process is performed at one of members 306, 308, or 310. In this example, a write request is received at a member (330). The write request can be expressed in any appropriate way. In one embodiment, the write request is expressed as a change, such as a semantic command, as described above. In one embodiment, the write request is expressed as data, e.g., the write request is made by sending the changed columns and/or rows. In some embodiments, a changed data item is sent. The changed data item may be denoted by a reference associated with an index. The write is performed on the member (332). For example, the write may be performed according to the process shown in FIG. 2B. The write request is sent to the master (334).

In some embodiments, some or all of the data can be identified by a reference. References may be contextual to a particular index. In some embodiments, all indexes are described in a global data description. The global data description may be described in a markup language, such as RTXML.

It is determined whether performing the write would cause a conflict (336). For example, the write may be to a record that has been deleted. If it is determined that there would not be a conflict, the write is performed on the master (338). For example, the write may be performed according to the process shown in FIG. 2B. If it is determined that there would be a conflict, the conflict is reconciled (340). For example, the write request can be ignored or other actions can be taken. For example, if the write is to a record that has been deleted, a user can be prompted regarding whether to insert the record. In some embodiments, a conflict management system specifies how conflicts should be reconciled, e.g., in a markup language.

An indication of the status of the write request is sent to the member (342). The indication could be implicit. For example, the indication could be the write request (in the case where there is no conflict) or instructions for resolving the conflict (in the case where there is conflict). For example, if there is no conflict on the master, in some embodiments, a write request is sent to all the members. In some embodiments, the member stores the write requests it sends to the master and upon receiving an indication of success (of the write request on the master), the member removes that write request from where it is stored. As such, the member can verify the merging of the write requests (with the master). If there is conflict on the master, in some embodiments, status is sent only the originating member. In some embodiments, upon receiving an indication of conflict, the originating member reverses the write.

Thus, in a distributed database, a local version of a database may be written to optimistically (i.e., by assuming the local version is correct) without consulting a master version of the database. Provisional or optimistic write authority can decrease latency, particularly in a highly distributed system.

Figure 4A:
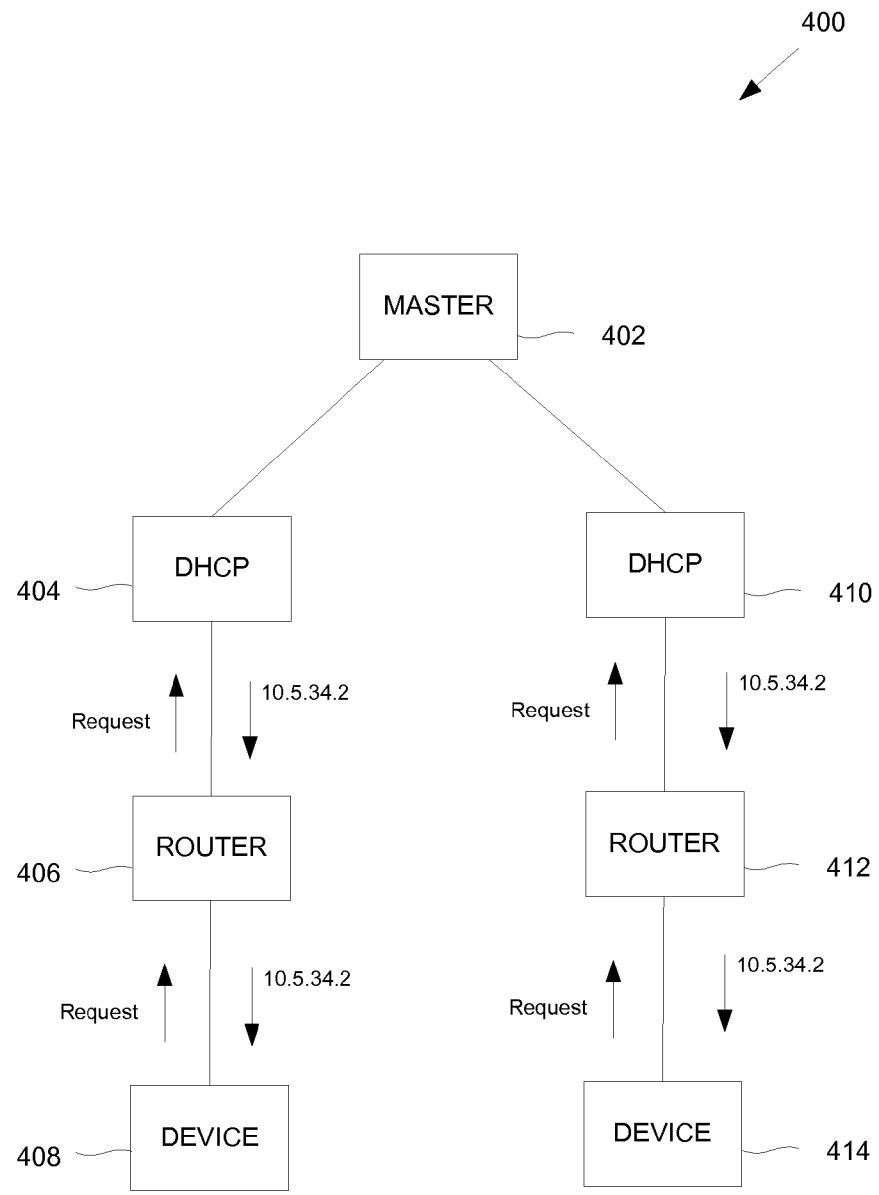
FIGS. 4A-4C are diagrams illustrating a DHCP example of provisionally writing data in a distributed database.
Figure 4B:
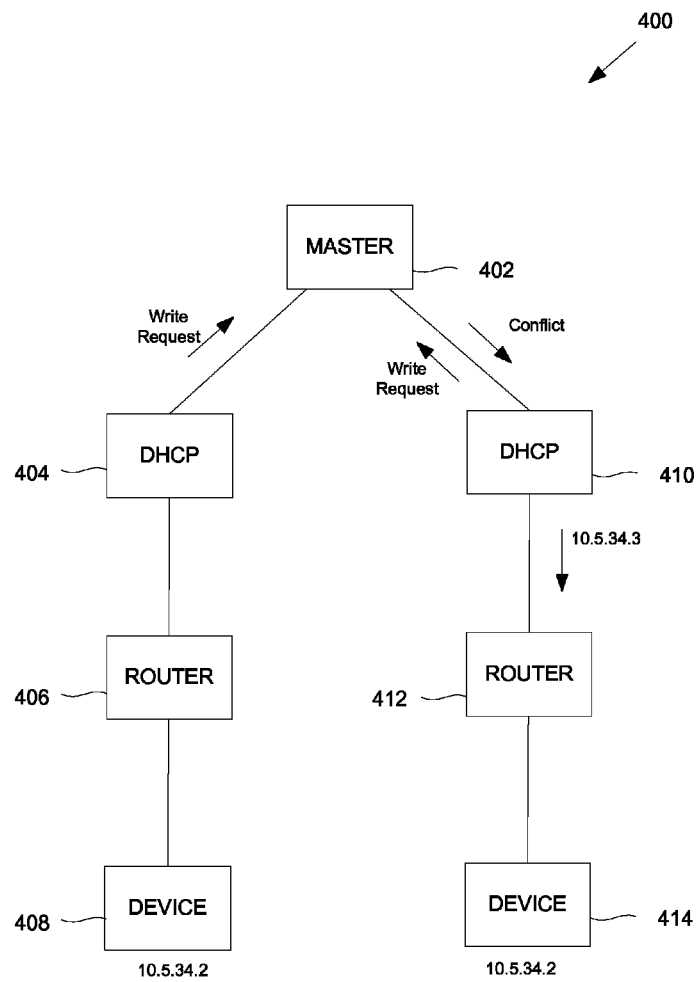
Figure 4C:
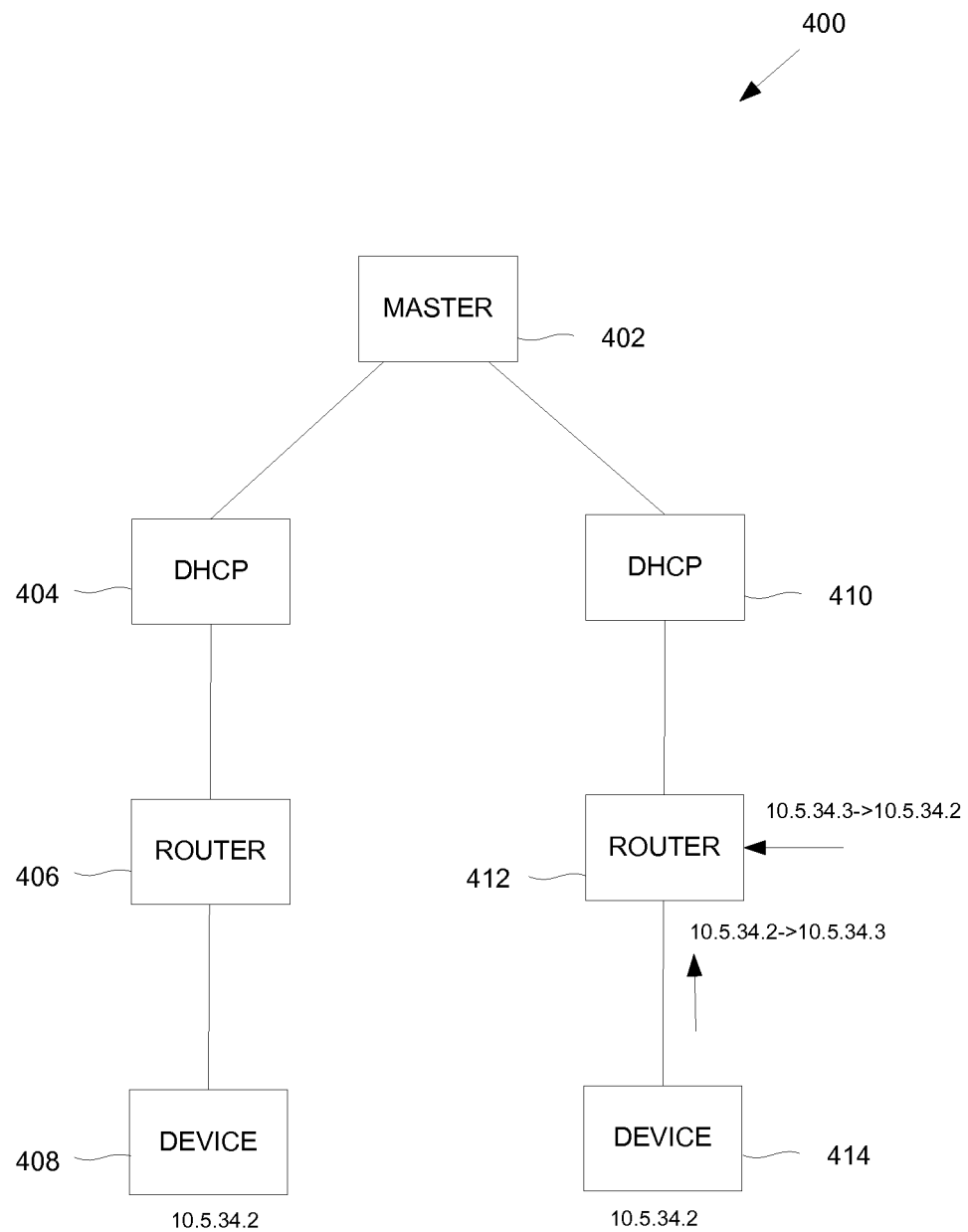

FIGS. 4A-4C are diagrams illustrating a DHCP example of provisionally writing data in a distributed database. In this example, system 400 is shown to include master 402, members 404 and 410, routers 406 and 412, and host devices 408 and 414. Members 404 and 410 are servers or appliances that provide DHCP service. Master 402 has a master copy of a DHCP database. Each member 404 and 410 has a local copy of the DHCP database. DHCP member 404 serves router 406 and device 408 in this example. Similarly, DHCP member 410 serves router 412 and device 414. Devices 408 and 414 are network devices each requesting an IP address assignment using DHCP. Router 406 is the first upstream network device from device 408. Router 412 is the first upstream network device from device 414.

In FIG. 4A, device 408 is shown requesting an IP address. The request is received by router 406 and forwarded to DHCP member 404. DHCP member 404 accesses its local copy of the DHCP database and assigns IP address "10.5.34.2" to device 408. Member 404 writes to its local copy of the DHCP database to reflect the assignment. Member 404 sends the assignment to router 406, which forwards the assignment to device 408. Device 408 operates using IP address "10.5.34.2". Similarly, device 414 is shown requesting an IP address. The request is received by router 412 and forwarded to DHCP member 410. DHCP member 410 accesses its local copy of the DHCP database and assigns IP address "10.5.34.2" to device 414. Member 410 writes to its local copy of the DHCP database to reflect the assignment. Member 410 sends the assignment to router 412, which forward the assignment to device 414. Device 414 operates using IP address "10.5.34.2".

In FIG. 4B, member 404 sends a write request (corresponding to the IP address assignment of "10.5.34.2" to device 408) to master 402. Master 402 receives the write request and updates the master copy of the database accordingly. At a later time, member 410 sends a write request (corresponding to the IP address assignment of "10.5.34.2" to device 414) to master 402. Master 402 receives the write request and determines that there is a conflict. In this case, both devices 408 and 414 cannot be assigned the same IP address. The conflict is resolved. An indication of the conflict is sent to member 410. Member 410 assigns a new IP address "10.5.34.3" to device 414. The new assignment is sent to router 412. Router 412 is updated so that IP address "10.5.34.2" is mapped to "10.5.34.3" via network address translation (NAT) as shown in FIG. 4C. For example, packets arriving at router 412 with destination address "10.5.34.3" are redirected to "10.5.34.2". The source address in each packet from device arriving at router 412 may also be mapped from "10.5.34.2" to "10.5.34.3". Device 414 does not need to be aware that its IP address is being remapped by router 412. Device 414 can keep its current IP address assignment until it renews its lease. As such, the distributed database is self adaptive (or self healing).

Figure 5A:
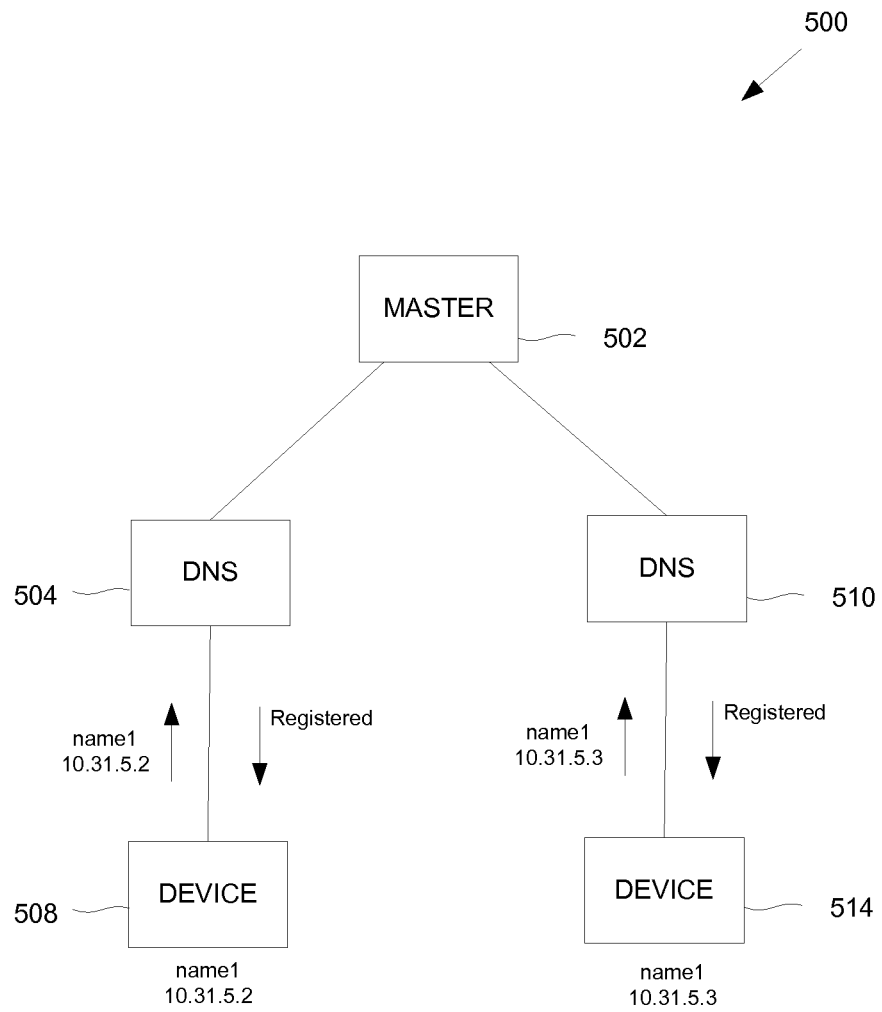
FIGS. 5A-5B are diagrams illustrating a DNS example of provisionally writing data in a distributed database.
Figure 5B:
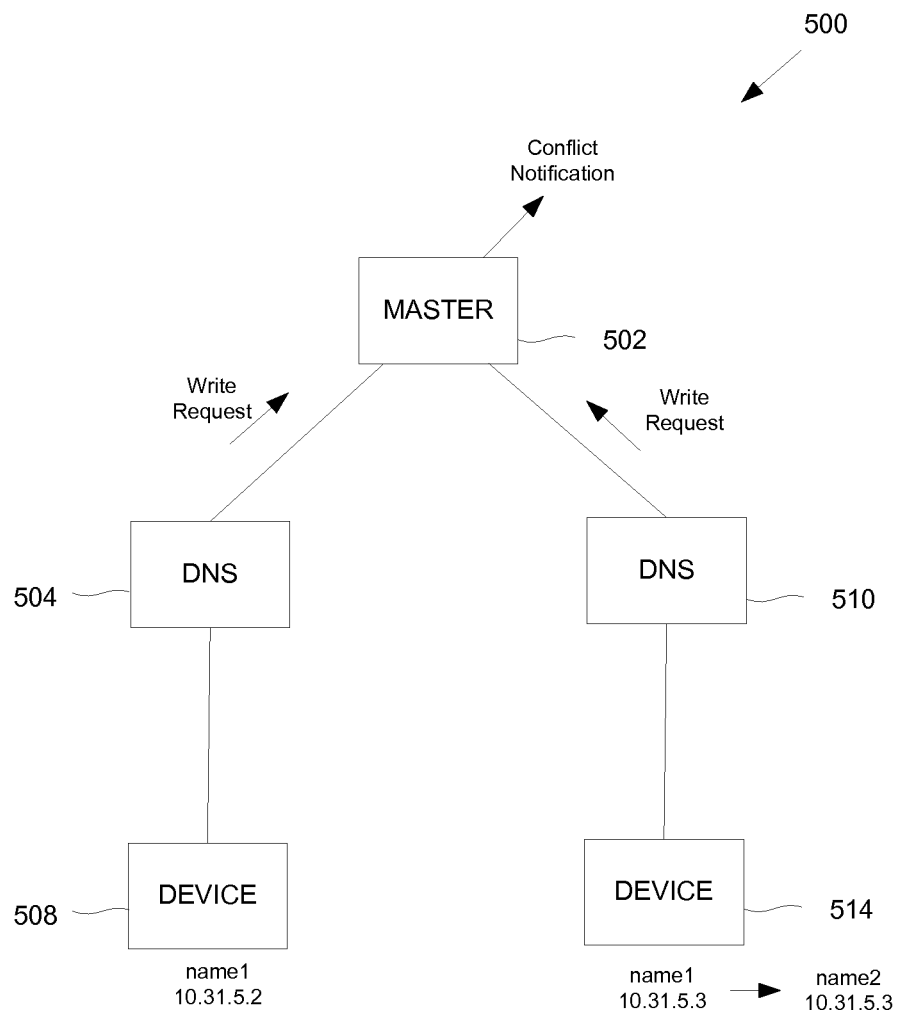

FIGS. 5A-5B are diagrams illustrating a DNS example of provisionally writing data in a distributed database. In this example, system 500 is shown to include master 502, members 504 and 510, and devices 508 and 514. Members 504 and 510 are servers or appliances that provide DNS service. Master 502 has a master copy of a DNS database. Each member 504 and 510 has a local copy of the DNS database. DNS member 504 serves device 508 and DNS member 510 serves device 514 in this example. Devices 508 and 514 are network devices each registering a host name and IP address using the DNS protocol.

Device 508 is shown registering hostname "name1" and IP address "10.31.5.2" on member 504. Member 504 writes to its local copy of the DNS database to reflect the hostname, IP address pair. Similarly, device 514 is shown registering hostname "name1" and IP address "10.31.5.3" on member 510. Member 510 writes to its local copy of the DNS database to reflect the hostname, IP address pair.

In FIG. 5B, member 504 sends a write request (corresponding to registration of "name1", "10.31.5.2") to master 502. Master 502 receives the write request and updates the master database accordingly. Later, member 510 sends a write request (corresponding to the registration of "name1", "10.31.4.3") to master 502. Master 502 receives the write request and determines that there is a conflict. In this case, hostname "name1" cannot be registered by two devices. The conflict is resolved. In one embodiment, a notification is sent to an administrator. The administrator responds to the conflict as appropriate. For example, the administrator could change the hostname on device 514 to "name2" to resolve the conflict.

Figure 6A:
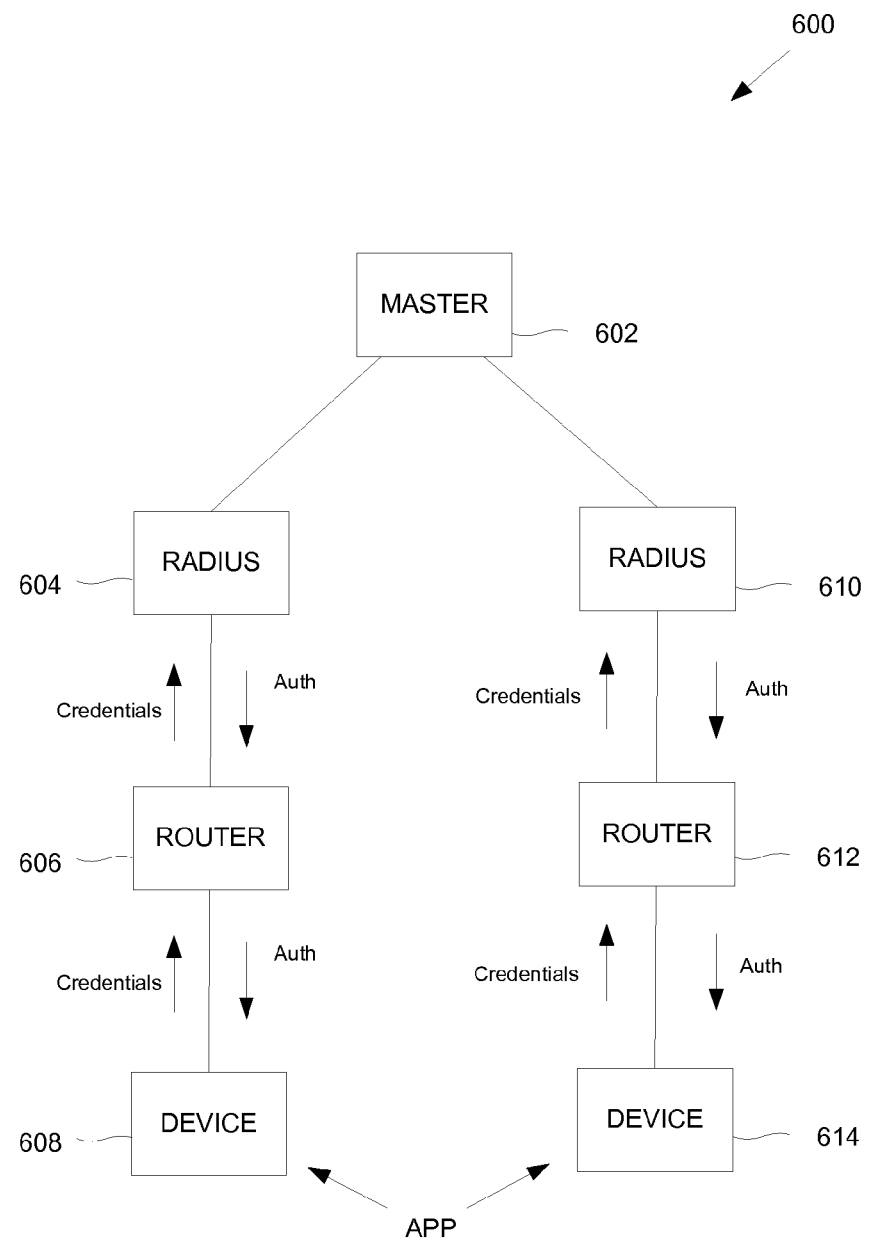
FIGS. 6A-6B are diagrams illustrating a RADIUS example of provisionally writing data in a distributed database.
Figure 6B:
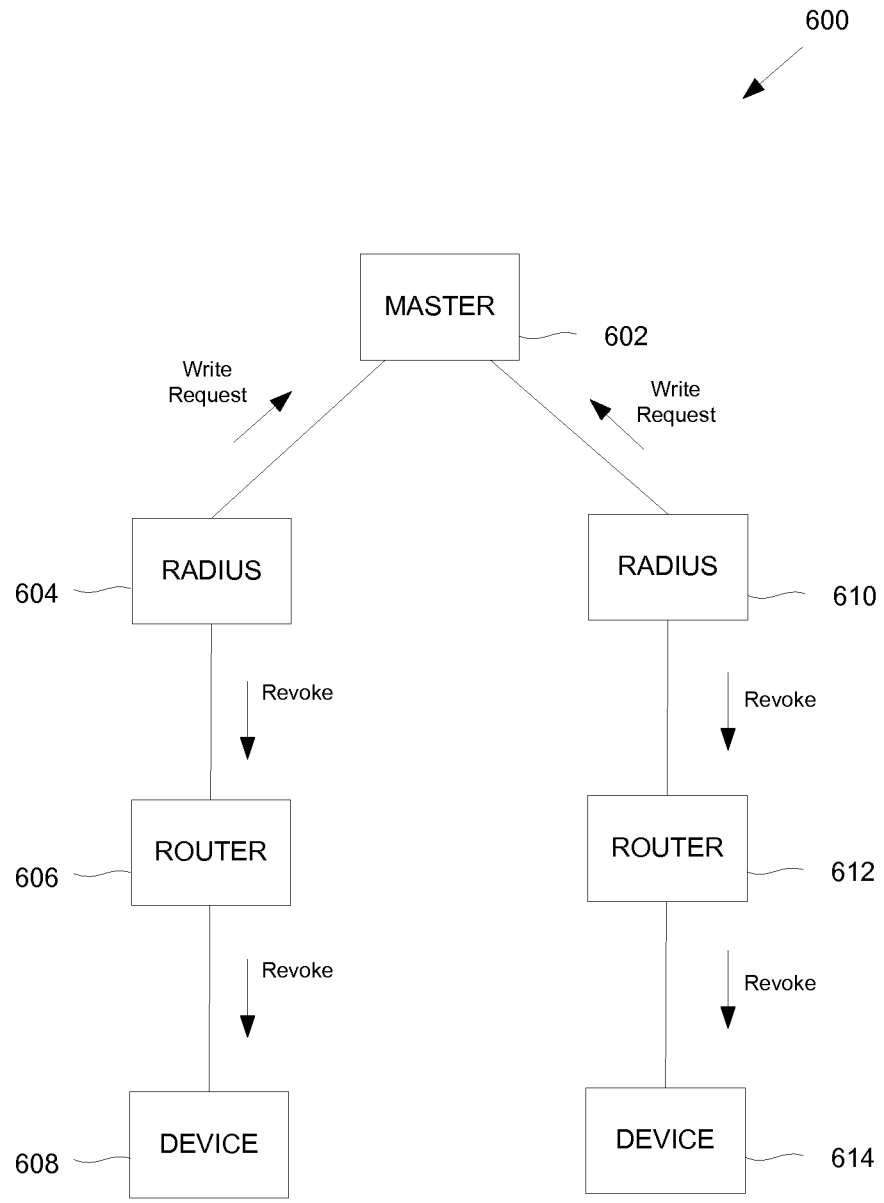

FIGS. 6A-6B are diagrams illustrating a RADIUS example of provisionally writing data in a distributed database. In this example, system 600 is shown to include master 602, members 604 and 610, routers 606 and 612, and host devices 608 and 614. Members 604 and 610 are servers or appliances that provide RADIUS service. Master 602 has a master copy of a RADIUS database. Each member 604 and 610 has a local copy of the RADIUS database. RADIUS member 604 serves router 606 and device 608 in this example. Similarly, RADIUS member 610 serves router 612 and device 614. Each of devices 608 and 614 is a network device, such as a computer or a laptop. A user of device 608 is prompted for credentials by router 606, in response to a network access attempt, for example. Similarly, a user of device 614 is prompted for credentials by router 612. Router 606 is the first upstream network device from device 608. Router 612 is the first upstream network device from device 614. Router 606 blocks traffic to/from device 608 until the user of device 608 is authorized/authenticated, e.g., using 802.1X policy enforcement. Similarly, router 612 blocks traffic to/from device 614 until the user of device 614 is authorized/authenticated.

In FIG. 6A, device 608 is shown sending credentials. The credentials are received by router 606 and forwarded to RADIUS member 604. RADIUS member 604 determines whether to authorize and authenticate the user. For example, RADIUS member 604 accesses its local copy of the RADIUS database and determines whether the credentials are correct and/or whether the user is authorized. In some embodiments, the user is authorized if the user has not authorized previously within some time period. Member 604 writes to its local copy of the RADIUS database to reflect the authorization and/or authentication. Member 604 sends the update to router 606, which then allows traffic flow to/from device 608. Similarly, device 614 is shown sending credentials. The credentials are received by router 612 and forwarded to RADIUS member 610. RADIUS member 610 determines whether to authorize and authenticate the user. For example, RADIUS member 610 accesses its local copy of the RADIUS database and determines whether the credentials are correct and/or whether the user is authorized. Member 610 writes to its local copy of the RADIUS database to reflect the authorization and/or authentication. Member 610 sends the update to router 612, which then allows traffic flow to/from device 614.

In FIG. 6B, member 604 sends a write request (corresponding to the authorization/authentication of the user on device 608) to master 602. Master 602 receives the write request and updates the master copy of the database accordingly. At a later time, member 610 sends a write request (corresponding to the authorization/authentication of the user on device 614) to master 602. Master 602 receives the write request and determines that there is a conflict. In this case, assume that both write requests were made within a certain time period and that the same user cannot be authorized more than once within a certain time period. For example, the user was already authenticated within a certain time period, which could indicate a distributed attack. In one embodiment, an indication of the conflict, such as a revocation list, is sent to routers 606 and 612. Routers 606 and 612 are updated to revoke authorization for that user. In some embodiments, related information such as the length of time the user has been logged in is logged. In some embodiments, provisional writes are disabled for that user for a certain length of time. In other words, a write received from that user at a member is not applied to the member without first consulting the master.

In another example, provisional write authority in a RADIUS distributed database can reduce sign-on, or the number of times a user needs to sign on. For example, if a particular user has been authorized/authenticated at device 608, and the user attempts to access the network using device 614, the user does not need to sign on again. Router 612 forwards the request to RADIUS member 610, which recognizes that the user is already authorized/authenticated at device 608. RADIUS member 610 writes to its local database to authorize/authenticate the user at device 614, sends a message back to the switch, and the switch allows the user to access the network via device 614.

Figure 7A:
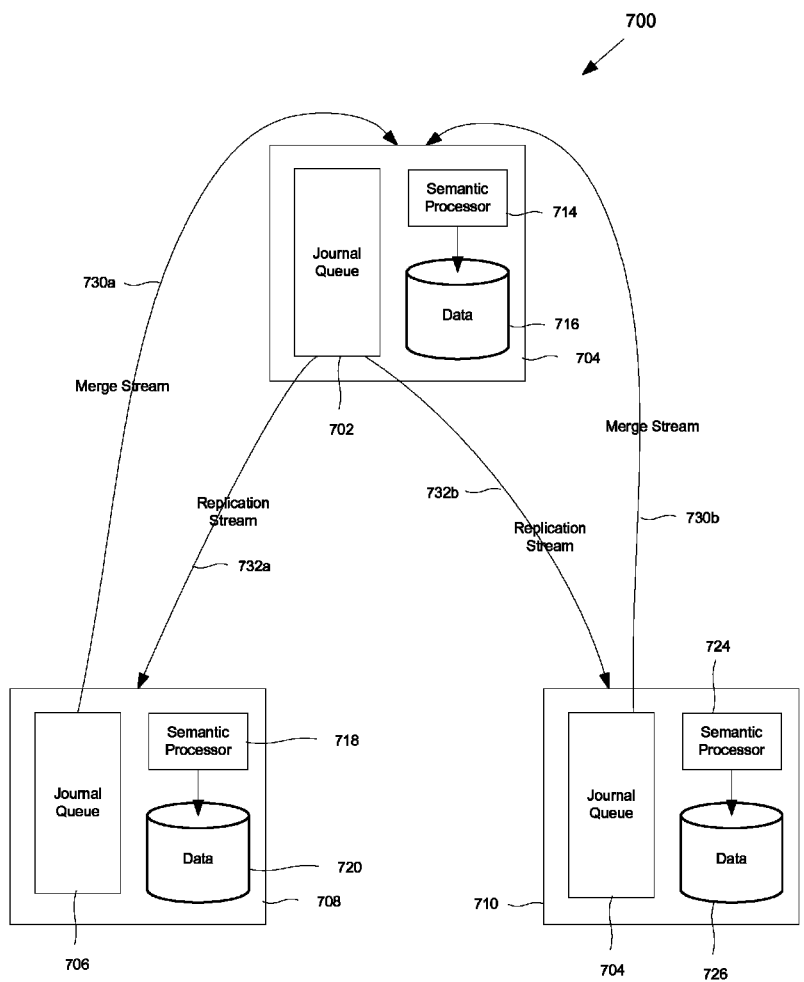
FIG. 7A is a diagram illustrating a system for reconciling provisionally written data in a distributed database.

FIG. 7A is a diagram illustrating a system for reconciling provisionally written data in a distributed database. In this example, system 700 is shown to include master 704 and two members 708 and 710. Any number of members may be included in other embodiments. Master 704 is shown to include journal queue 702, semantic processor 714, and a master version of the database 716. Member 708 is shown to include journal queue 706, semantic processor 718, and a local version of the database 720. Member 710 is shown to include semantic journal queue 704, processor 724 and a local version of the database 726. In some embodiments, semantic processor 714, 718, and 724 are not needed, e.g., in a system that performs replication by propagating data rather than semantics. In this example, nodes 704, 708, and 710 communicate over merge stream 730a and 730b and replication stream 732a and 732b.

Each of members 708 and 710 has provisional write authority. In other words, a write request (e.g., update) received at any one of members 708 and 710 is optimistically applied to the local (member) database without having to consult the master. At a later time, the local database and master database are reconciled, as more fully described below. For example, a write request received at member 708 is applied to database 720 and placed in journal queue 706. In some embodiments, writing to database 720 and writing to journal queue 706 are performed as a single atomic transaction. Later, the write is propagated to the master over merge stream 730a to reconcile the write with the master. At a later time, the master propagates the write request (or conflict status) over replication streams 732a and 732b to members 708 and 710, respectively.

In some embodiments, the journal queue is stored as a file. A write may be stored in the journal queue in any appropriate way. In some embodiments, the journal queue is a database of items (or records). An item, as used herein, refers to a write request, transaction, command, instruction, function, data, operation or any other unit appropriate for storing the write. In some embodiments, a semantic command is decomposed into primitives and the primitives are stored. For example, primitives may include insert, update, delete, or an aggregate group of operations that are interdependent. For example, a command to update a single record may be stored, or a single command associated with updating 5 million records (e.g., from "infoblox.com" to "infoblox.abc.com") may be stored. In some embodiments, a markup language is used to store items in the journal queue. In some embodiments, data is stored in the journal queue and data is pushed up the merge stream to the master. In some embodiments, all the nodes share the same semantics, e.g., they are all relational databases, and relational database commands are stored in the journal queue.

FIG. 7B is a flowchart illustrating a method of provisionally writing data in a distributed database at a member. In some embodiments, this process is performed at one of members 708 or 710. In this example, a write request is received at a member (740). As used herein, this member is referred to as the member who originated the request, or the "originating member". The write request may be received from a command line interface or an application, for example. In some embodiments, the write request is expressed as a change, such as a semantic command, as described above. In some embodiments, the write request is expressed as data, i.e., the write request is expressed by the changed columns and/or rows. The write is applied to the member database and journal queue as a single atomic transaction (742). For example, if the write is received at member 710, it is applied to database 726 and journal queue 704 in one atomic transaction. In some embodiments, Berkeley DB, such as a version made by Sleepycat Software in Lincoln, Mass., or another transactional subsystem that ensures atomicity of transactions is used. The write request may be applied according to the process shown in FIG. 2B, or the write may be performed by placing data in the database. The write may be stored in the journal queue as one or more items, as described above.

FIG. 7C is a flowchart illustrating a process for propagating an item from a journal queue to a master. In some embodiments, this process is performed at one of members 708 or 710 by a journal replicator (or journal replication process). This process may be performed in parallel with the process of FIG. 7B. In this example, the journal queue is read (746). In some embodiments, the journal queue is stored as a database and the journal replicator performs a database transaction to read from the queue. One or more items may be read from the journal queue. In some embodiments, the item(s) is removed from the journal queue after it is read. In other embodiments, the item(s) remains in the journal queue until a response is later received from the master, as more fully described below. The item(s) is sent to the master on the merge stream (748). Items may be read from the journal queue at regular intervals or at other times.

Figure 7D:
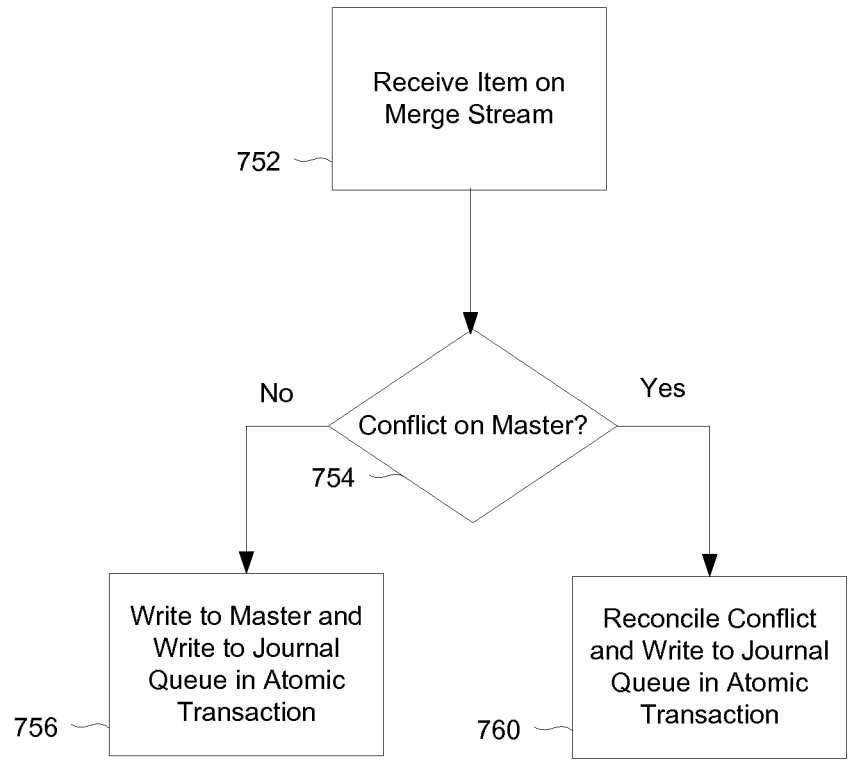
FIG. 7D is a flowchart illustrating a method of reconciling provisionally written data in a distributed database at a master.

FIG. 7D is a flowchart illustrating a method of reconciling provisionally written data in a distributed database at a master. In some embodiments, this process is performed at master 704 in response to receiving an item on the merge stream from a member, as in (748) described above. In this example, an item is received on the merge stream (752). For example, the item may be the item sent in (748). The item may be a write request, or a component of a write request, such as a primitive, as described above. In some embodiments, more than one item is received and combined into a higher level write request. It is determined whether executing the item would cause a conflict on the master (754). If it is determined that there would not be a conflict (754), the item is executed on the master and written to the master journal queue in one atomic transaction (756). If it is determined that there would be a conflict on the master, the conflict is reconciled (760). For example, there may be a conflict resolution system that specifies how conflicts should be reconciled. In some embodiments, status information is sent to the originating member over the replication stream. In some embodiments, status information (indicating a conflict) is placed in the journal queue for sending back to the originating member at a later time, as more fully described below.

Figure 7E:
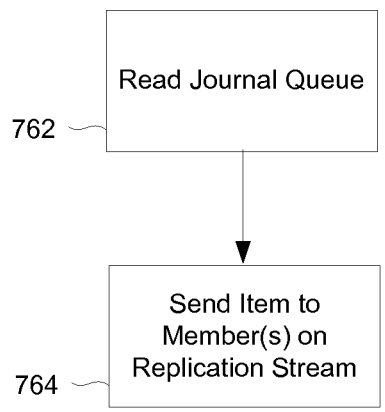
FIG. 7E is a flowchart illustrating a process for propagating an item from a journal queue to a member.

FIG. 7E is a flowchart illustrating a process for propagating an item from a journal queue to a member. In some embodiments, this process is performed at master 704 by a journal replicator (or journal replication process). The journal replicator reads the queue and sends item(s) to the member(s). This process may be performed in parallel with the process of FIG. 7D. In this example, the journal queue is read (762). In some embodiments, the journal queue is stored as a database and the journal replicator performs a database transaction to read from the queue. One or more items may be read from the journal queue. For example, the item may be a write request or status information (indicating whether there was a conflict). In some embodiments, the item(s) is removed from the journal queue after it is read. The item(s) is sent to the member on the replication stream (764). Items may be read from the journal queue at regular intervals or at other times. The item may be sent to the originating member and/or any other member(s). For example, if the item is status information indicating that there was a conflict on the master, the item would be sent to the originating member. If the item is a write request (indicating that there was no conflict on the master), the item would be propagated to all members. In this case, the item is "lazily" replicated over the merge stream to members.

Figure 7F:
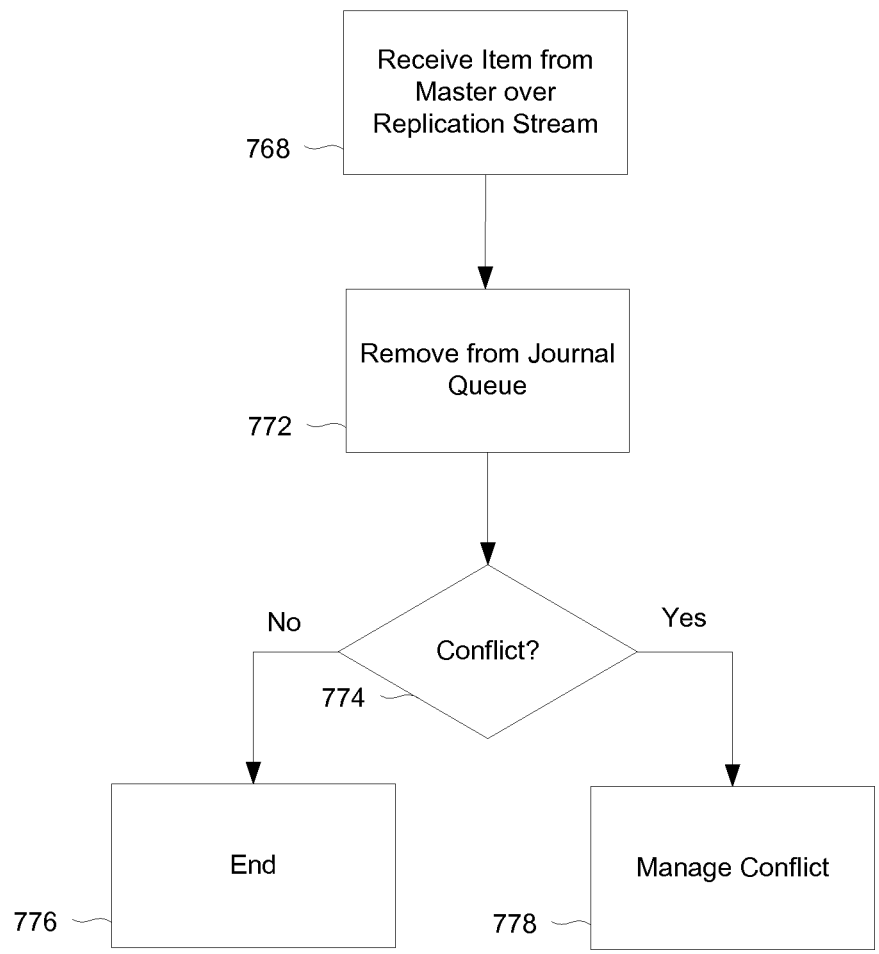
FIG. 7F is a flowchart illustrating a method of receiving an item on the replication stream at an originating member.

FIG. 7F is a flowchart illustrating a method of receiving an item on the replication stream at an originating member. In some embodiments, this process is performed on one of members 708 or 710 in response to receiving an item on the replication stream from a master, as described above. In this example, the item is received from the master over the replication stream (768). The item is removed from the journal queue (772). In other words, the member recognizes its own write request and garbage collects the journal queue. In this way, the journal queue can be used to verify that a write request has been reconciled with the master. It is determined whether there was a conflict (774) on the master. If it is determined that there was a conflict, the conflict is managed (778). For example, the corresponding transaction, operation, or semantic command may be backed out of the member database. If it is determined that there was not a conflict, the process ends (776). In some embodiments, removing the item from the journal queue and managing the conflict are performed as one atomic transaction. This way, if the conflict is not handled, the journal queue is still aware of that fact. In some embodiments, removing the item from the journal queue is optional. In this case, the item may have been removed from the journal queue when it was originally sent over the merge stream.

Figure 7G:
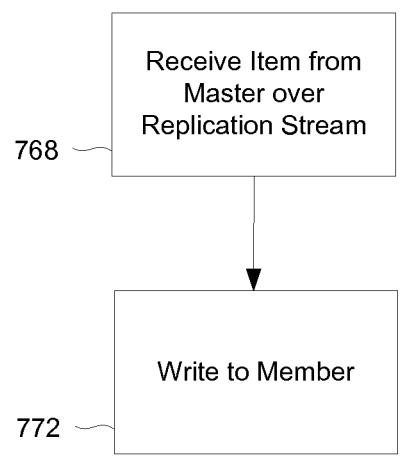
FIG. 7G is a flowchart illustrating a method of receiving an item on the replication stream at a non-originating member.

FIG. 7G is a flowchart illustrating a method of receiving an item on the replication stream at a non-originating member. In some embodiments, this process is performed on one of members 708 or 710 in response to receiving an item on the replication stream from a master, as described above. In this example, an item is received from the master over the replication stream (780). For example, the item was applied to the master without conflict and the item has been sent to the member for replication. The write is applied to the member database (782). In some embodiments, this process is performed on all non-originating members to synchronize the member databases with the master database.

In some embodiments, the processes described above are performed within system 700. For example, if member 708 is the originating member, the processes of FIGS. 7B, 7C, and 7F are performed on member 708. The processes of FIGS. 7D and 7E are performed on master 704. The process of FIG. 7G is performed on non-originating member 710. In one embodiment, member 708 receives a write request in the form of a semantic command and the semantic command is processed by semantic processor 718. Semantic processor 718 interprets the semantic command and applies appropriate operations to database 720. In the same atomic transaction, the semantic command is placed in journal queue 706. The semantic command is decomposed into primitives and the primitives are stored in journal queue 706. The primitives are propagated over merge stream 730a to be reconciled with the master. If there is a conflict, master 704 notifies member 708. If there is not a conflict, master 704 applies the primitives and propagates the primitives to members 708 and 710 over replication stream 732a and 732b. In some embodiments, this is done via journal queue 706. Member 708 receives the primitives and removes them from journal queue 706. Member 710 receives the primitives and applies them to local database 726.

Figure 8:
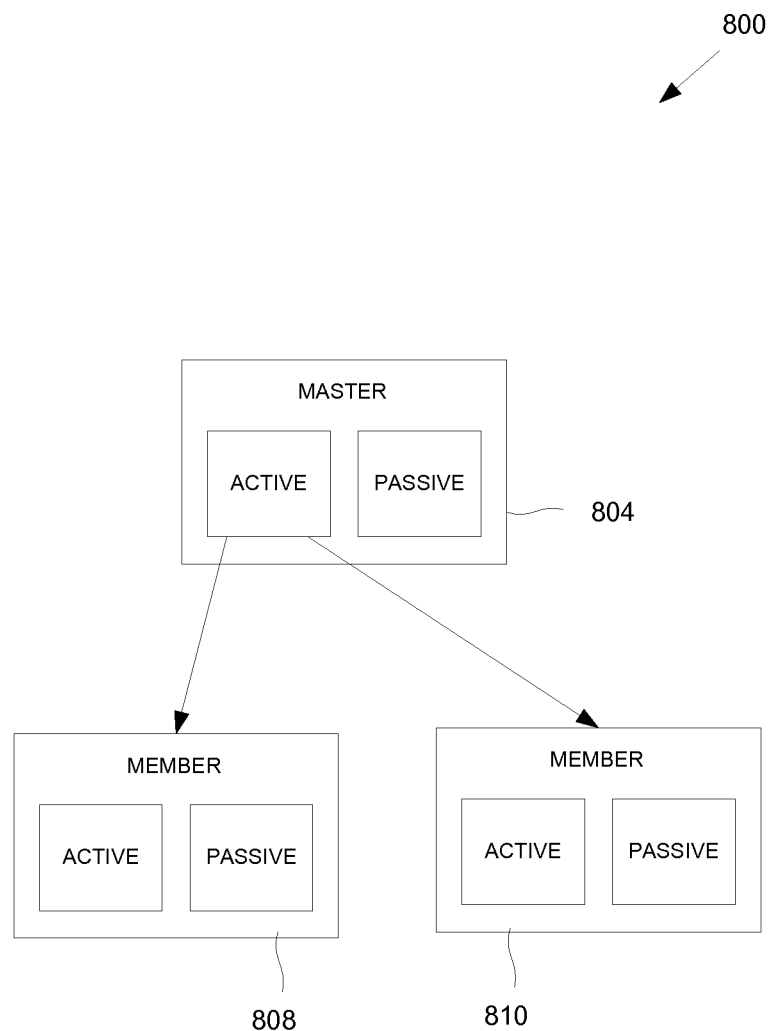
FIG. 8 is a diagram illustrating a system for performing atomic transactions in a distributed database.

FIG. 8 is a diagram illustrating a system for performing atomic transactions in a distributed database. In this example, system 800 is shown to include master 804 and two members 808 and 810. Master 804 is shown to be an HA pair including an active node and a passive node. Similarly each of members 808 and 810 is an HA pair including an active node and a passive node. The active node provides access to the database and the passive node serves as a backup to the active node.

If, master 804 receives a write request, the write request is applied to the active node (written to the database in the active node) and to the passive node as a single atomic transaction. In other words, the write is transactionally replicated to the passive node. Thus, the active and passive nodes are transactionally consistent. If a node fails, there is no data loss. The write is then propagated to the members. Each member applies the write to the active node and the passive node in a single atomic transaction. The write may be expressed in any appropriate way, such as a semantic or other command or instruction. The write may be expressed as data that is to be pushed to (written to) the database, in the case of data replication.

In this example, members 808 and 810 may or may not have provisional write authority. In the case where members 808 and 810 have provisional write authority, a write request received at a member is applied to the active and passive nodes within the member as an atomic transaction. The write is then propagated to the master.

Figure 9A:
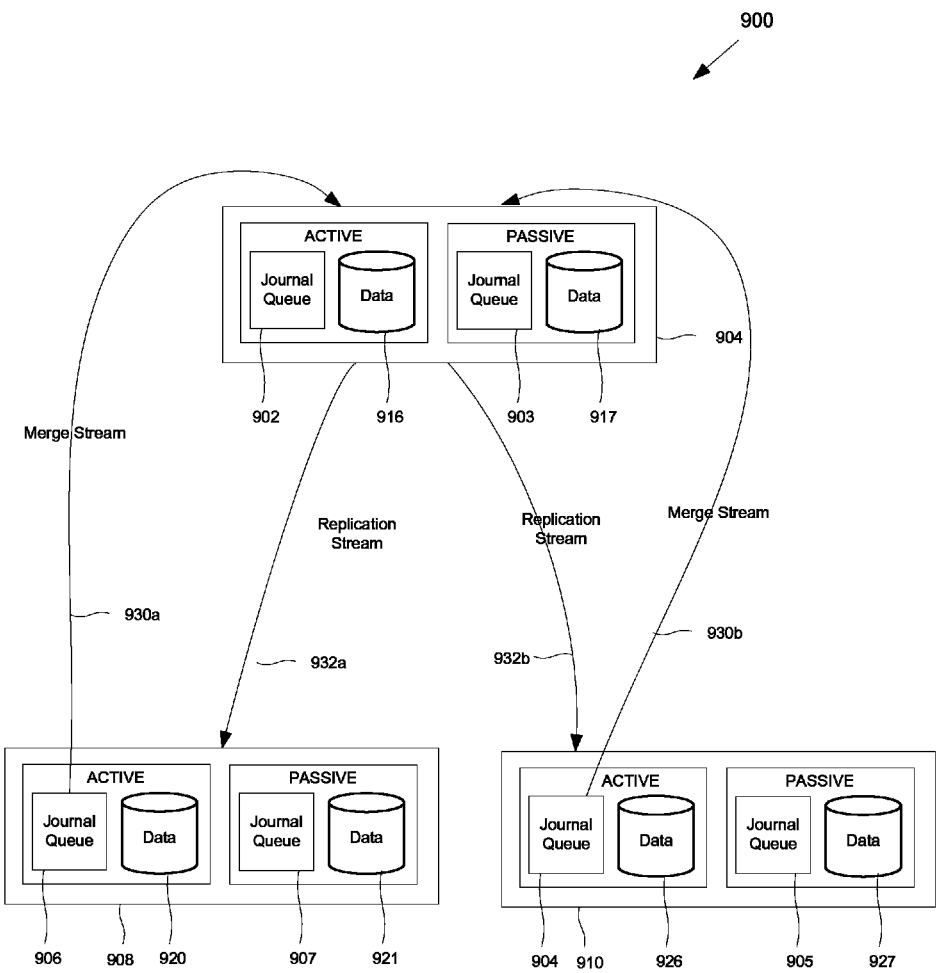
FIG. 9A is a diagram illustrating a system for provisionally writing data using atomic transactions in a distributed database.

FIG. 9A is a diagram illustrating a system for provisionally writing data using atomic transactions in a distributed database. In this example, system 900 is shown to include master 904 and two members 908 and 910. Any number of members may be included in other embodiments. Master 904 is shown to include an active node and a passive node. Similarly, each of members 908 and 910 includes an active node and a passive node. The active node provides access to the local database. For example, when a read (e.g., select) request is received at member 908, active database 920 is read. The passive node serves as a backup to the active node. In the event of failure of the active node, the passive node handles database access at that member. Each node includes a journal queue and a local version of the database. In some embodiments, each node includes a semantic processor and/or semantic translation processor.

In some embodiments, members 908 and 910 each have provisional write authority. A write request received at member 908 is applied to local database 920 and placed in journal queue 906 in a single atomic transaction. The write request is also applied to the passive node, i.e., the write request is applied to local database 921 and placed in journal queue 907 in a single atomic transaction. In some embodiments, the write to the active node (to database 920 and to journal queue 906) and the write to the passive node (to database 921 and to journal queue 907) are part one atomic transaction. In other words, the write is transactionally replicated to the passive node. Thus, the databases and journal queues on both the active and the passive nodes are transactionally consistent.

Later, the write (e.g., journal queue item(s)) is propagated from journal queue 906 to the master over merge stream 930a to reconcile the write with database 916 on the master. In other words, the write is lazily replicated to the master. If there is no conflict on the master, the write request is applied to active database 916 and placed in journal queue 902 in a single atomic transaction. The write request is also applied to the passive node, i.e., the write request is applied to local database 917 and placed in journal queue 903 in a single atomic transaction. In some embodiments, the write to the active node (to database 916 and to journal queue 902) and the write to the passive node (to database 917 and to journal queue 903) are part of one atomic transaction.

At a later time, master 904 propagates the write request (or conflict status) over replication streams 932a and 932b. In the case of no conflict, the write request is replicated to all members in some embodiments. In other words, the write is lazily replicated to the members. In some embodiments, the write is replicated to all members except the originating member. In the case of conflict, a conflict indication is sent to the originating member. In some embodiments, the conflict indication is sent to all members. This may be the case for ease of implementation, for example.

As described above, each member receives the information over its respective replication stream. The originating member 908 confirms the write (in the case where there is no conflict) and manages the conflict (e.g., backs out the transaction) in the case where there is a conflict. The corresponding item(s) is removed from the journal queue on the active node and on the passive node. In some embodiments, removing the item(s) from the journal queue occurs on the active and passive node in a single atomic transaction. The non-originating member 910 applies the write (as it has not seen the write before), in the case where there was no conflict on the master. Member 910 manages the conflict in the case where there is a conflict. For example, if the conflict was that a write request was received for an object that was deleted, the conflict resolution may specify that the request should be ignored.

In this example, a write to a first version of the database in the node and a write to an entity representative of a state of the first version of the database are performed in one atomic transaction. The entity could be a journal queue or a second version of the database in a passive node.

In case of network segmentation or failure, having transactional replication between the active and passive nodes means that the active and passive versions (copies) of the database are transactionally consistent. As such, there is no data loss in the event of a node failure. In addition, having the journal queue write and database write on each node also be transactionally consistent means that there is no loss of data being merged with the master. If a member gets disconnected from the master, the journal queue can continue to fill up locally.

Markup Language Specification of a Database Schema

Databases may be organized in a particular schema, such as an object oriented or a relational schema, each of which is specific to a database language. Routines to access and manage the data are implemented in a specific database language, which requires intricate knowledge of the language. Further, existing schemas typically do not provide a straightforward way to handle relationships between various objects in the database. Logical data consistency of these relationships is maintained by implementing database language specific routines, which is time consuming and prone to error. A more robust method of implementing a database schema is needed.

Generating a database schema is disclosed. The database schema is specified in a markup language and translated into an in memory representation. Specific database language code is generated from the in memory representation. Database relationships may be enforced by specifying within a database schema a reference type that associates two structures and specifies the relationship between the two structures, and automatically generating code that checks the relationship between the two structures.

Figure 9B:
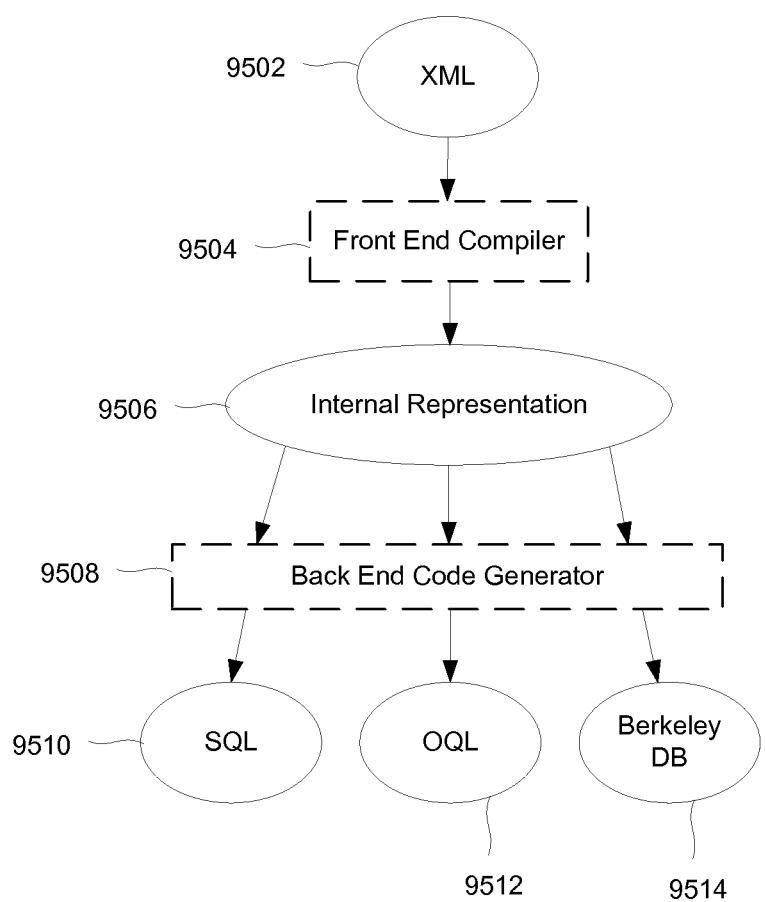
FIG. 9B is a block diagram illustrating how a markup language representation of a database is transformed into a specific database schema.

FIG. 9B is a block diagram illustrating how a markup language representation of a database is transformed into a specific database schema. In this example, a markup language based on Extensible Markup Language (XML) specifies a database schema. This markup language is referred to as Runtime XML (RTXML). RTXML specifies the objects in the database and the logical relationships between objects in the database. RTXML also provides mechanisms to check values in the database for consistency. Using RTXML to specify the database schema provides a layer of abstraction from the target database language, which can greatly simplify development time and effort. In this example, XML 9502 is processed by a front end compiler 9504 into an internal representation 9506. For example, the XML structures may be represented by compiled C code. A backend code generator 9508 processes internal representation 906 and generates a database language specific representation of the structures. For example, Structured Query Language (SQL) 9510, Object Query Language (OQL) 9512, or Berkeley DB 9514 (e.g., a version made by Sleepycat Software) are examples of some of the database schema that may be generated. In some embodiments, backend code generator 9508 includes a separate code generator for each database language that may be desired.

The following is an example of RTXML code (Example 1):

```
<package name=".com.infoblox.dns">
    <structure name="host">
        <member name="zone" type=".com.infoblox.dns.zone"
ref-type="deep" key-type="key">
            <syntax string_length="64"/>
        </member>
        <member name="host_name" type="rtxml.string"
key-type="key">
            <syntax string_length="64"/>
        </member>
        <member name="ip_address" type="rtxml.string">
            <syntax "ip_address"/>
        </member>
    </structure>
    <function name="insert_host">
        <argument name="zone"/>
        <argument name="host_name"/>
        <argument name="ip_address"/>
        <return name="host" query="INSERT INTO host (zone,
host_name, ip_address) values
('${zone}','${host_name}','${ip_address})">
        </return>
    </function>
</package>
```

In this example, one structure and one function are specified within a package ".com.infoblox.dns". Structure is an example of a tag defined in RTXML. The structure has a name "host" and is a host structure. The host structure includes three members: a zone, a host_name, and an ip_address. The zone member includes three attributes: a type, a ref-type, and a key-type. The existence of the ref-type attribute indicates that the structure refers to another structure of type indicated by the type attribute. In this case, the type is ".com.infoblox.dns.zone", so the host structure refers to a zone structure (not shown) defined in the package .com.infoblox.dns.

The ref-type attribute, in this case "deep", indicates the type of relationship between this structure and a parent structure (the structure to which this structure refers) or child structures (structures referring to this structure). A ref-type of "deep" indicates that if the parent structure does not exist, the structure cannot exist. In this case, the host structure cannot exist unless the parent zone structure exists. A ref-type of "shallow" indicates that it is not necessary for a parent or a child of the structure to exist. A ref-type of "pinned" indicates that the structure cannot be deleted if there is a child structure referring to it. A key-type of "key" indicates that the member is part of the key for that structure. The key is a unique identifier of the structure. In some embodiments, the key is a concatenation of the values of all members tagged as keys. In this case, members host_name and zone are tagged as keys. If the host_name is "mail" and the zone is "infoblox.com", the key would be "mail.infoblox.com". A syntax tag is also shown within the zone member, indicating that member zone must follow the specified syntax rule (in this case, the zone value is of maximum length 64). Similarly, members host_name and ip_address have various attributes to describe their characteristics. Any number of other structures may also be defined.

The function has a name "insert_host" and includes three arguments: "zone", "host_name", and "ip_address". The "return" tag indicates the function to be generated. For example, if this code were part of XML 9502 from FIG. 9A, SQL 9510 would include the SQL table of the host structure and an SQL function ("insert_host(zone, host_name, ip_address") that is provided, for example, as part of a supplemental library.

Any other function can be represented in RTXML. For example, database functions, such as update, insert, delete, and select, can similarly be defined in RTXML.

Figure 10:
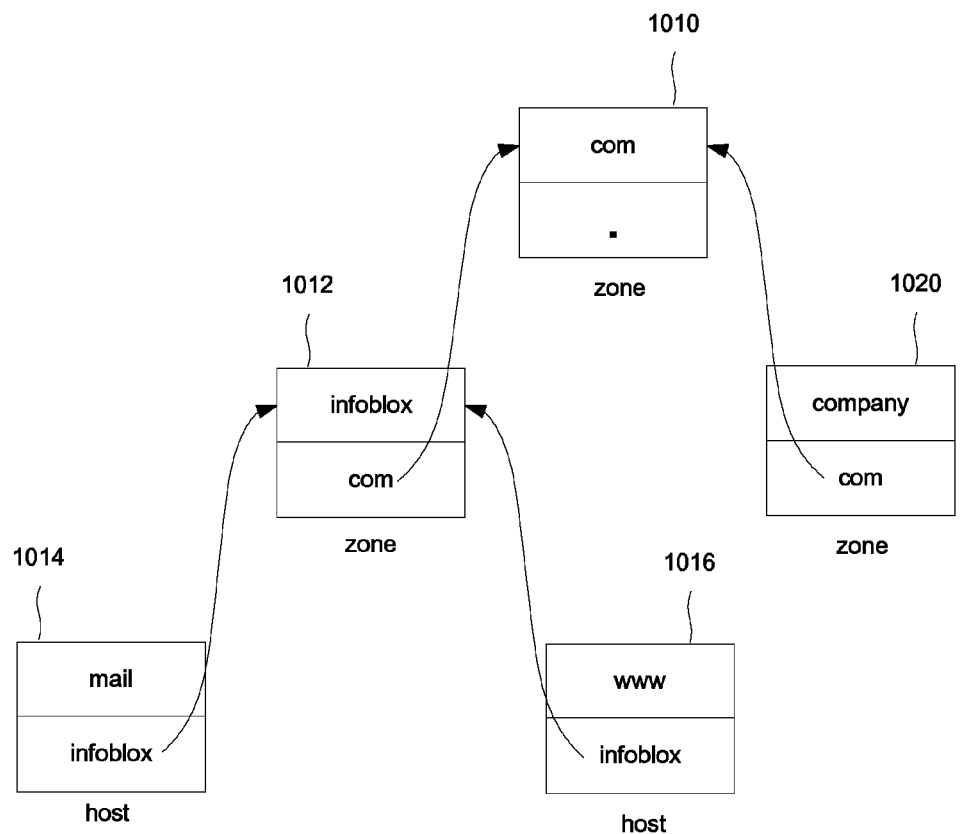
FIG. 10 is a diagram illustrating the relationships between various structures that can be defined using ref-types.

FIG. 10 is a diagram illustrating the relationships between various structures that can be defined using ref-types. In this example, each node 1010-1020 represents a structure. Three zone structures 1010, 1012, and 1020 and two host structures 1014 and 1016 are shown. Each node representing a host structure shows the host_name and type. For example, host structure 1014 has host_name "mail" and type "infoblox". The type indicates the referenced structure, or parent structure. In the case of host structure 1014, the parent structure is zone structure 1012 with zone_name "infoblox". Similarly, zone structure 1012 has type "com", indicating that zone structure 1012 references zone structure 1010 with zone_name "com". Zone structure 1010 has type ".", indicating that there is no zone above zone 1010. A structure can thus refer to a structure of the same type, as shown by the zone structure in this example. Also shown are the parent and child relationships that can exist between structures. In this case, zone 1010 is the parent of zone 1012 and zone 1020, zone 1012 is the parent of host 1014 and host 1016, host 1014 and host 1016 are children of zone 1012, and zone 1012, and zone 1020 are children of zone 1010.

Figure 11:
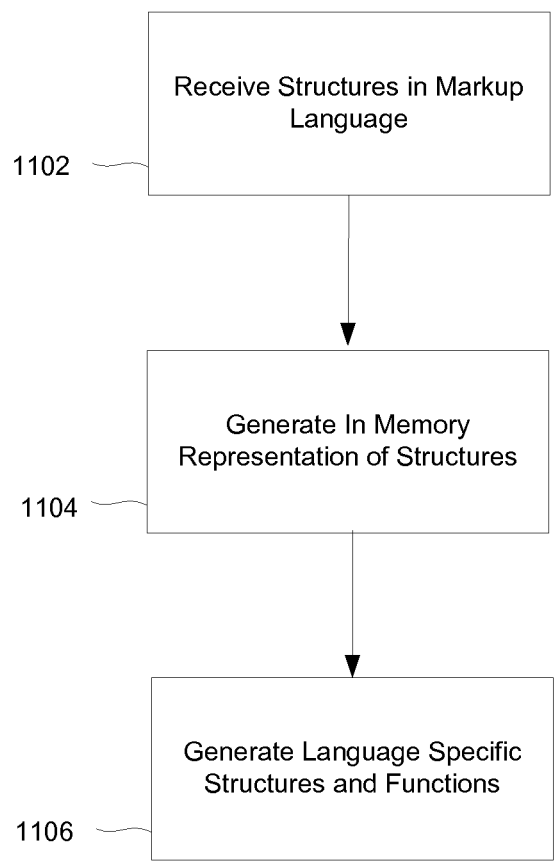
FIG. 11 is a flowchart illustrating a method of generating a database schema from a markup language representation of the database.

FIG. 11 is a flowchart illustrating a method of generating a database schema from a markup language representation of the database. In this example, structures in a markup language are received (1102). For example, a markup language such as RTXML is specified where the specification includes various structures and functions. (e.g., XML 9502 in FIG. 9B). An in memory representation of the structures is generated (1104). (e.g., internal representation 9506 in FIG. 9B) For example, a front end compiler may generate the in memory representation, as more fully described below. Language specific structures and functions are generated (1106). (e.g., specific database blocks 9510-9514) For example, a back end code generator may take the in memory representation of the structures and generate the equivalent database language specific code, such as SQL code, as more fully described below. The functions may be provided as part of a library to the developer, for example.

Figure 12:
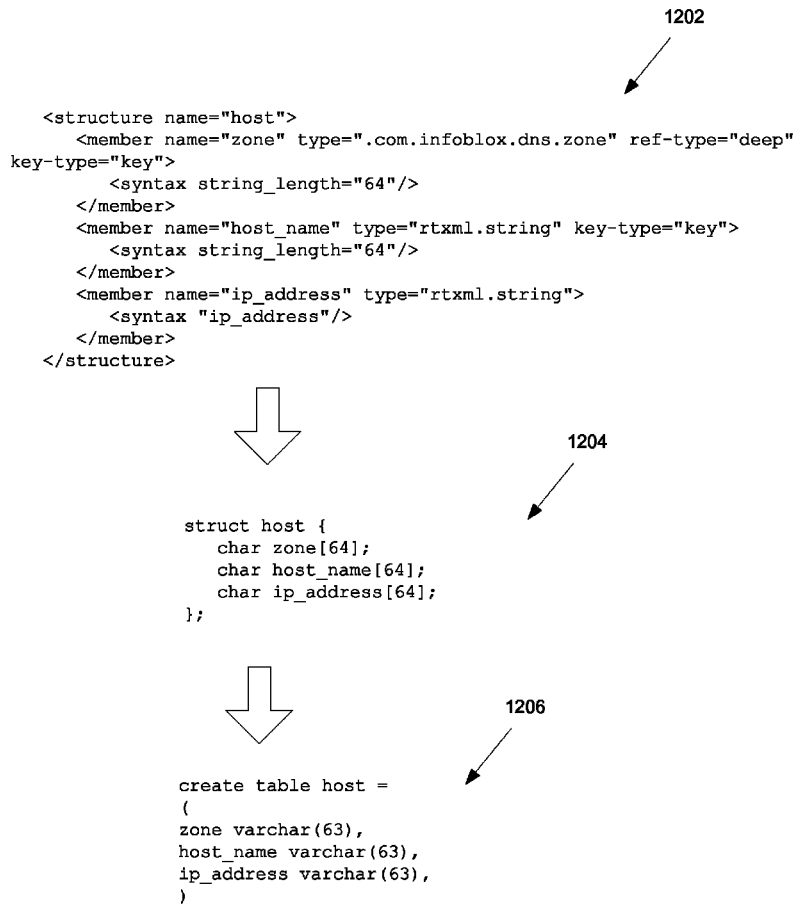
FIG. 12 is a diagram illustrating an example of generating an SQL table from an RTXML representation of the table.

FIG. 12 is a diagram illustrating an example of generating an SQL table from an RTXML representation of the table. In this example, the first portion of RTXML code from Example 1 (RTXML 1202) is shown. From RTXML 1202 an in memory representation is generated, as described in step 1104. In some embodiments, the in memory representation of the structures is represented by compiled C code 1204. For example, a structure in RTXML would be equivalent to a structure in C. There are many other ways in which in memory structures can be stored, such as in a hash table, for example. For simplicity, additional code that may also be included is not shown in this example. For example, code representing the ref-type and key information is not shown. Compiled C code 1204 is used to generate an SQL representation of the host structure 1206, as described in step 1106. For example, a structure in C would be equivalent to a table in SQL. Alternatively, to generate an OQL database, assuming the equivalent to an RTXML structure in OQL is a field, code to create an OQL field would be shown instead of code 1206. Similarly, in the case of a Berkeley DB database, the appropriate Berkeley DB syntax would be generated to insert the in memory structure and its associated key into a Berkeley DB database.

An RTXML function, such as "insert_host" shown above, would be similarly stored as an in memory structure and then converted to a specific database language, such as SQL. In some embodiments, certain functions are implicit in a structure definition. For example, for each structure, insert, delete, update, and select functions may be generated automatically.

Figure 13:
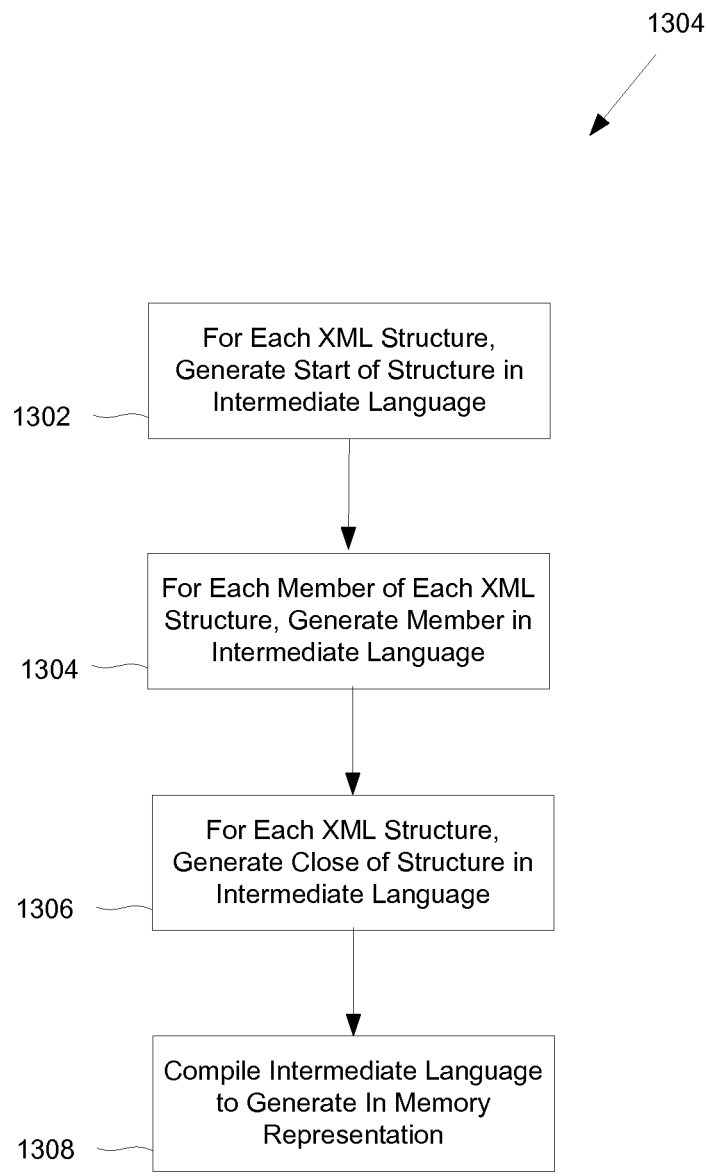
FIG. 13 is a flowchart illustrating a method of generating an in memory representation of an RTXML structure.

FIG. 13 is a flowchart illustrating a method of generating an in memory representation of an RTXML structure. In some embodiments, this process can be used to perform step 1104 from FIG. 11. In this example, an XML file is parsed. For each XML structure, the start of a structure is generated in an intermediate language (1302), such as C or Java. For example, assuming RTXML 1202 is being parsed, the following code would be generated in C:

struct host {

For each member of each XML structure, the member is generated in the intermediate language (1304). For example, assuming RTXML 1202 is being parsed, the following code would be generated in C:

char zone[64];
char host_name[64];
char ip_address[64];

For each XML structure, a close of structure is generated in the intermediate language (1306). For example, assuming RTXML 1202 is being parsed, "};" would be generated in C:

As such, C code 1204 would be generated by this process. The intermediate language is compiled to generate an in memory representation (1308). In this example, a C compiler could be used to generate the in memory representation of the host structure.

Figure 14:
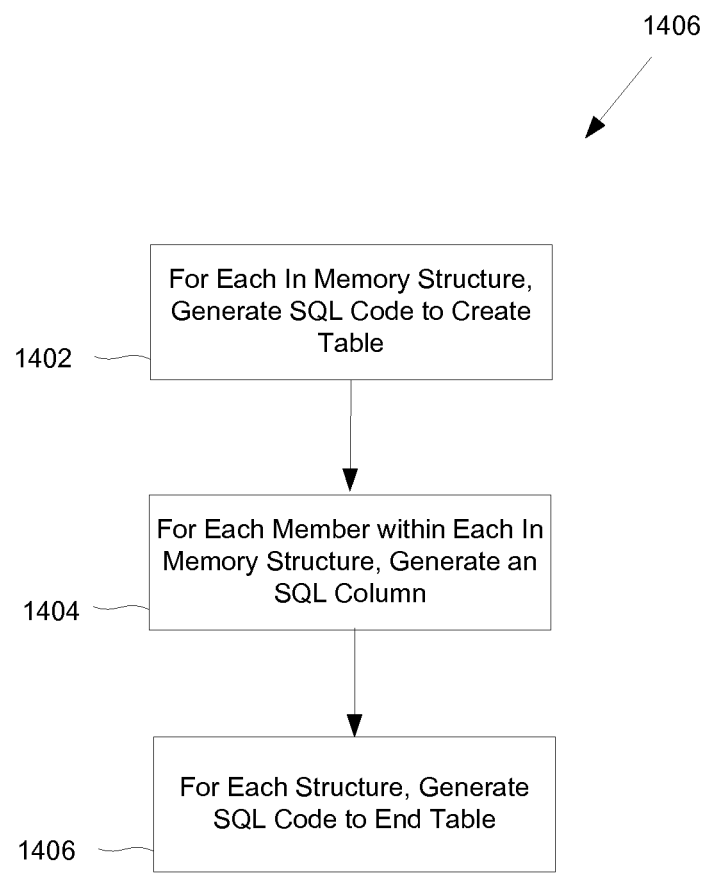
FIG. 14 is a flowchart illustrating a method of generating an SQL table from an in memory representation of a structure.

FIG. 14 is a flowchart illustrating a method of generating an SQL table from an in memory representation of a structure. In some embodiments, this process can be used to perform step 1106 from FIG. 11. In this example, in memory structures are parsed. For each in memory structure, SQL code is generated to create a table. For example, assuming the in memory representation of code 1204 is being parsed, the following code would be generated in SQL to indicate the beginning of a table creation:

create table host=(

For each member within each in memory structure, an SQL column is generated. For example, assuming the in memory representation of code 1204 is being parsed, the following code would be generated in SQL:

zone varchar(63),
host_name varchar(63),
ip_address varchar(63),

For each structure, SQL code closing the table is generated (1406). For example, assuming the in memory representation of code 1204 is being parsed, ")" would be generated in SQL to indicate the end of the table creation.

As such, the SQL code 1206 would be generated by this process. For simplicity, additional code that may also be included is not shown in this example. For example, code representing the ref-type and key information is not shown.

Figure 15:
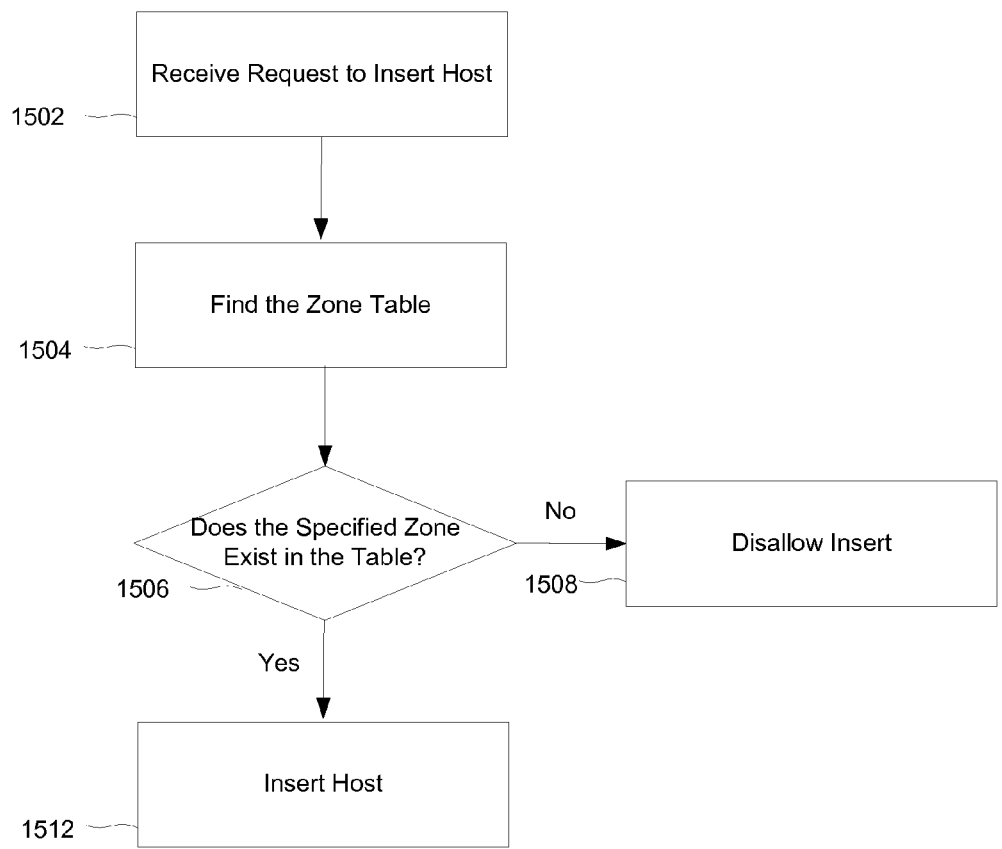
FIG. 15 is a flowchart illustrating a method of enforcing a reference during an insert.

FIG. 15 is a flowchart illustrating a method of enforcing a reference during an insert. For example, a host is of ref-type "deep", so logic must be provided to ensure that a host is not inserted unless it has a parent. This logic would execute each time a request to insert a host (or add a host) is received. A request to insert a host is received (1602). For example, a user may enter in SQL (or another target database language) the following:

insert_host("infoblox.com", "mail", "10.0.0.1")

The zone structure (i.e., table, in the case of SQL) that is being referenced is found (1504). It is determined whether the specified zone exists in the structure. In the above example, it is determined whether the specified zone "infoblox.com" exists. If the specified zone does not exist, the insert is disallowed (1508). If it is determined that the specified zone does exist, the host is inserted (1512).

Figure 16:
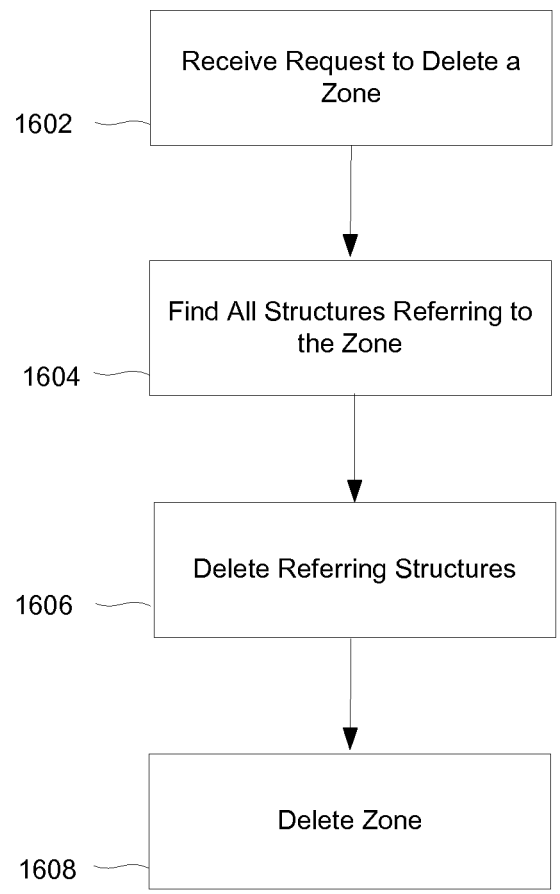
FIG. 16 is a flowchart illustrating a method of enforcing a reference during a delete.

FIG. 16 is a flowchart illustrating a method of enforcing a reference during a delete. For example, other structures such as host have a ref-type "deep" to zone, so logic must be provided to ensure that when a zone is deleted, structures referring to the zone are deleted to maintain logical database consistency. This logic would execute each time a request to delete a zone is received. A request to delete a zone is received (1502). For example, a user may enter in SQL (or another target database language) the following:

delete_zone("infoblox.com")

All structures referring to the zone are found (1604). For example, "mail.infoblox.com" and "www.infoblox.com" may be found in the above example. The referring structures are deleted (1606). i.e., "mail.infoblox.com" and "www.infoblox.com" would be deleted in the above example. Other types of structures may also be found and deleted. For example, if the zone to be deleted were ".com", zone structure "infoblox.com" would also be found and deleted. The zone is deleted (1608).

In some embodiments, not all referring structures are deleted. For example, if a referring structure has ref-type "shallow", there is no requirement for a parent of a child to exist. As such, any structure referring to the structure to be deleted would have its reference removed (e.g., nullified).

In some embodiments, it is not possible to delete all referring structures. For example, if a referring structure has ref-type "pinned", the structure may not be deleted if there is a child structure referring to it. As such, the attempt to delete would be disallowed.

In some embodiments, the logic described in FIGS. 15 and 16 is generated in step 1106 by a backend code generator. In one embodiment, the logic is integrated in functions provided in a supplemental library in step 1106 from FIG. 11. For example, the logic described in FIG. 15 would be provided in the "insert_host" function. The logic described in FIG. 16 would be provided in the "delete_zone" function. In other embodiments, the logic is provided implicitly by the target database language. For example, some target database languages may provide a way to specify and enforce these relationships.

Database Migration and Multiversion Database Cluster Management

Figure 1A:
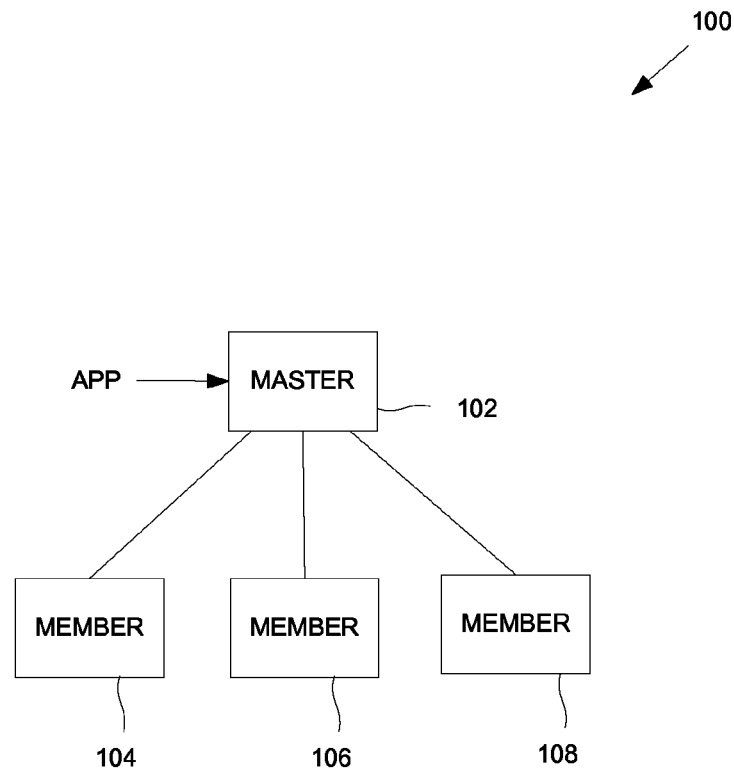
FIG. 1A is a diagram illustrating a centralized distributed database system 100.
Figure 1B:
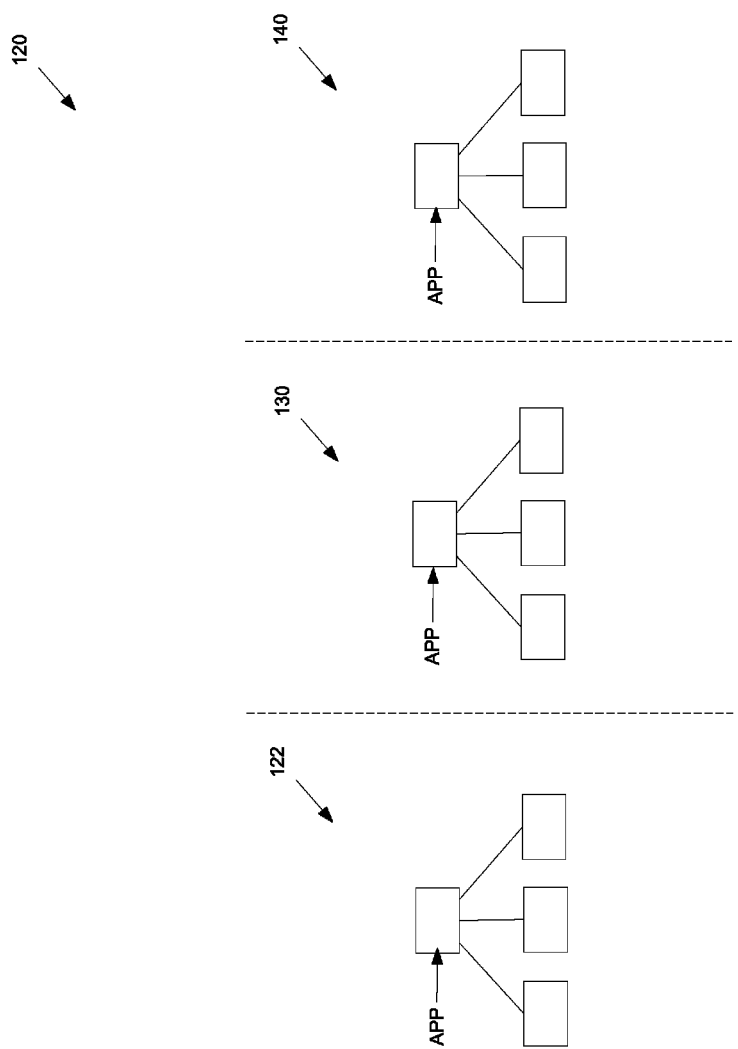
FIG. 1B is a diagram illustrating a partitioned distributed database system 120
Figure 17:
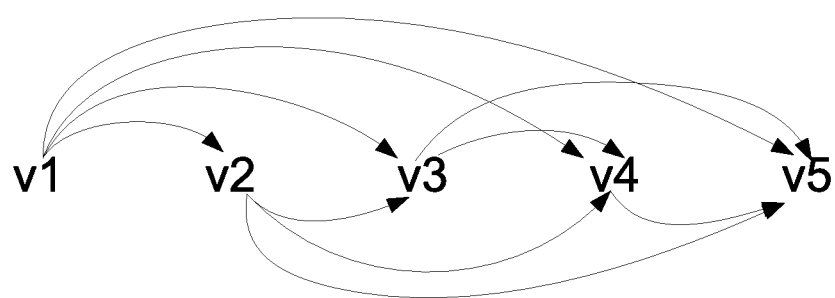
FIG. 17 is a diagram illustrating five versions of a database, v1 to v5.

A database schema describes the organization and structure of data in a database. Typically the schema of a database is modified incrementally with each new software release. FIG. 17 is a diagram illustrating five versions of a database, v1 to v5. For example, a first version (v1) of a customer database may include first name, last name, and SSN fields. In the next version (v2), a date of birth field may be added. As more versions are released, a customer site may end up with multiple databases each having different versions of software. Maintaining the logic to migrate the various existing versions to newer versions becomes increasingly difficult. For example, in FIG. 1, specific logic must be maintained to translate from v1 to v2, v1 to v3, v1 to v4, v1 to v5, v3 to v5, v2 to v3, v2 to v4, v4 to v5, and v2 to v5. In addition, it is difficult to express translations that span more than one version, such as a translation from v1 to v3. It would be desirable to have a simpler method for translating databases.

Converting a first version of a database to a second version is disclosed. Available translation steps are determined, a translation path from the first version of the database to the second version is selected, and translation steps in the translation path are executed.

Figure 18:
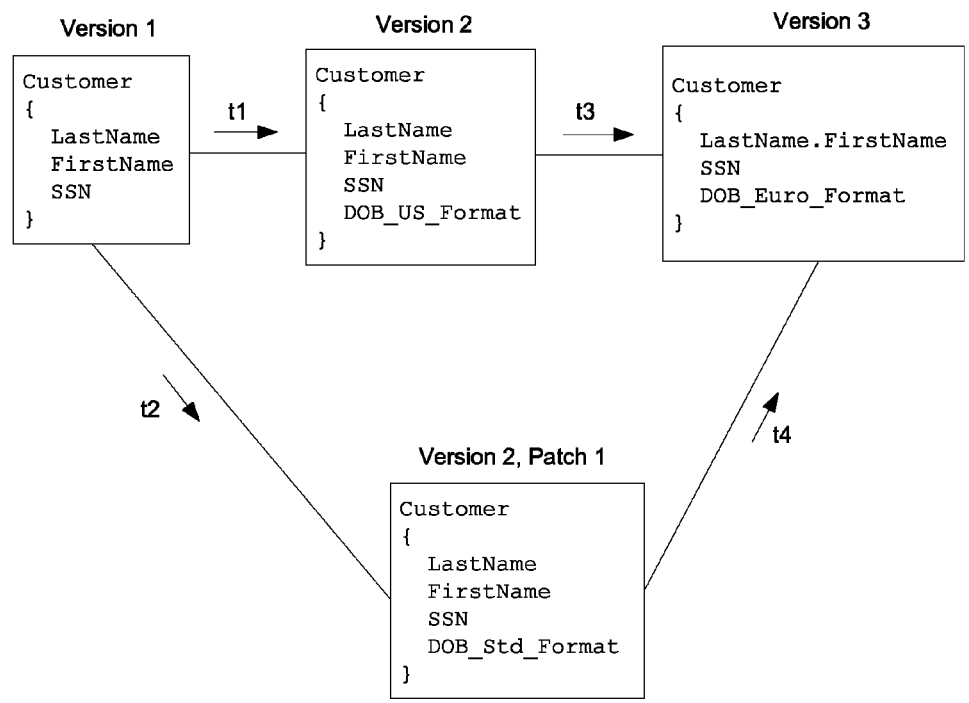
FIG. 18 is a diagram illustrating various versions of a database.

FIG. 18 is a diagram illustrating various versions of a database. In this example, Version 1 of the database includes a Customer object with three members: LastName, FirstName, and SSN. Version 2 of the database includes a customer object with four members: LastName, FirstName, SSN, and DOB_US_Format (i.e., month-date-year). Version 3 of the database includes a customer object with three members: LastName.FirstName, SSN, and DOB_Euro_Format (i.e., date-month-year). Version 2, patch 1 of the database includes a customer object with four members: LastName, FirstName, SSN, and DOB_Std_Format. Although objects are described in this example, any other appropriate data structures, such as tables or structures, may also be used.

t1 represents the translation from version 1 to version 2. t1 includes a new member translation for the Customer object, where the new member is DOB_US_Format. t2 represents the translation from version 1 to version 2, patch 1. t2 includes a new member translation for the Customer object, where the new member is DOB_Std_Format. t3 represents the translation from version 2 to version 3. t3 includes two member value transform translations for the Customer object. The first member value transform concatenates LastName and FirstName. The second member value transform reformats DOB_US_Format to DOB_Euro_Format. t4 represents the translation from version 2, patch 1 to version 3. t4 includes two member value transform translations for the Customer object. The first member value transform concatenates LastName and FirstName. The second member value transform reformats DOB_Std_Format to DOB_Euro Format. For example, to migrate a database from version 1 to version 3, either t1 and t3, or t2 and t4 can be applied. The translations are lossless and any available translation path can be taken. In one embodiment, each translation t1-t4 is expressed in a markup language such as XML, as more fully described below.

The following is an example of an XML description of a database (Example 1):

```
<database version="2.0.0_R18"/>
    <object>
        <property name="name" value="127.0.0.1"/>
        <property name="___type" value=".com.infoblox.one.node"/>
        <property name="first_name" value="John"/>
        <property name="last_name" value="Doe"/>
    </object>
    <object>
        <property name="name" value="com"/>
        <property name="___type" value=".com.infoblox.one.zone"/>
    </object>
        .
        .
        .
</database>
```

In this example, the specification describes version 2.0.0_R18 of a database. The database includes a plurality of objects. Each object includes one or more members, where a member includes a name value pair. For example, the first object has four members: name "127.0.0.1", type ".com.infoblox.one.node", first_name "John", and last_name "Doe". The first object is a node object. The second object has two members: name "com" and type ".com.infoblox.one.zone". The second object is a zone object. Any number of objects can be specified. In one embodiment, the XML description of the database used is RTXML, a markup language described above and in U.S. patent application Ser. No. 10/950,357, which was previously incorporated by reference.

The following is an example of a Migration Description XML (MDXML) specification of a translation (Example 2):

```
<STRUCTURE-TRANSFORM
STRUCT-NAME=".com.infoblox.one.node">
    <MEMBER-NAME-CHANGE PRE-XFORM-VALUE="name"
POST-XFORM-VALUE="node_name"/>
    <MEMBER-VALUE-CHANGE MEMBER-NAME="name"
    PRE-XFORM-VALUE="127.0.0.1"
POST-XFORM-VALUE="192.168.1.2"/>
    <MEMBER-VALUE-CHANGE MEMBER-NAME="name"
    PRE-XFORM-VALUE="127.0.0.2"
POST-XFORM-VALUE="192.168.1.3"/>
    <NEW-MEMBER MEMBER="DOB"
    DEFAULT-VALUE="Jan 1, 1970"
    <MEMBER-VALUE-XFORM>
        <concat>
            <first_name>
            <last_name>
        </concat>
        <destination full_name/>
    </MEMBER-VALUE-XFORM>
</STRUCTURE-TRANSFORM>
```

For example, MDXML may be used to describe a translation such as t1, t2, t3, or t4. In this example, the translation to be applied to structures of type ".com.infoblox.one.node" is specified. The translation may include a set of translations (or transforms), such as the following:

MEMBER-NAME-CHANGE changes the name of a member. For example, if the name of the structure was previously "name", it would be changed to "node_name".

MEMBER-VALUE-CHANGE changes the value of a member. For example, if the value of the name of the structure was previously "127.0.0.1", it would be changed to "192.168.1.2".

NEW-MEMBER adds a new member to the structure. For example, a new member with name "DOB" and value "Jan. 1, 1970" would be created in the structure.

MEMBER-VALUE-XFORM transforms the value of a member. For example, first_name and last_name values would be transformed according to the concat tag, where the concat tag could indicate a concatenation of the first_name and last_name values.

Other types of translations may also be specified for objects of type ".com.infoblox.one.node". Translations for other types of objects may also be specified.

The following is an example of an XML description of a database after the translation shown in Example 2 is applied to the database shown in Example 1 (Example 3):

```
<database version="2.0.0_R19"/>
    <object>
        <property name="node_name" value="192.168.1.2"/>
        <property name="___type" value=".com.infoblox.one.node"/>
        <property name="dob" value="Jan 1, 1970"/>
        <property name="full_name" value="John.Doe"/>
    </object>
    <object>
        <property name="name" value="com"/>
        <property name="___type" value=".com.infoblox.one.zone"/>
    </object>
    .
    .
    .
</database>
```

As shown, "node" has become "node_name". The member with name "_type" is unchanged. "dob" is a new member. "full_name" is a new member whose value is the concatenation of the first_name and last_name values. The zone object is the same, since there were no translations described for the zone object in the MDXML translation shown in Example 2.

Figure 19:
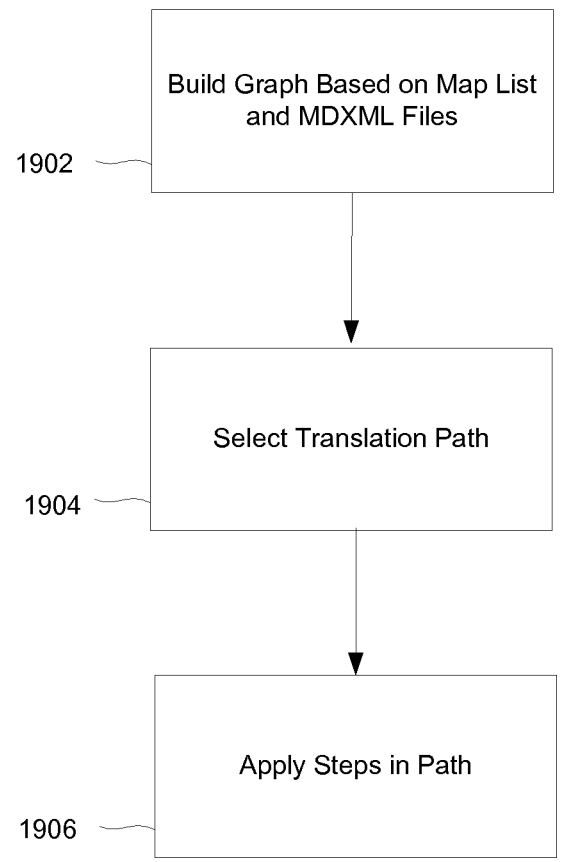
FIG. 19 is a flowchart illustrating a method of converting a database from a first version to a second version.

FIG. 19 is a flowchart illustrating a method of converting a database from a first version to a second version. In this example, a graph is built based on a map list and MDXML files (1902). The following is an example of a map list (Example 4):

```
<rtxml-version-map-list>
    <RTXML-VERSION-MAP version="2.0.0-R18"
    md5="2bf689e0aa69ab0663147908250cacc0"/>
    <RTXML-VERSION-MAP version="2.0.0-R19"
    md5="79fcd96045cb43147845d8336892a835"/>
</rtxml-version-map-list>
```

Figure 20:
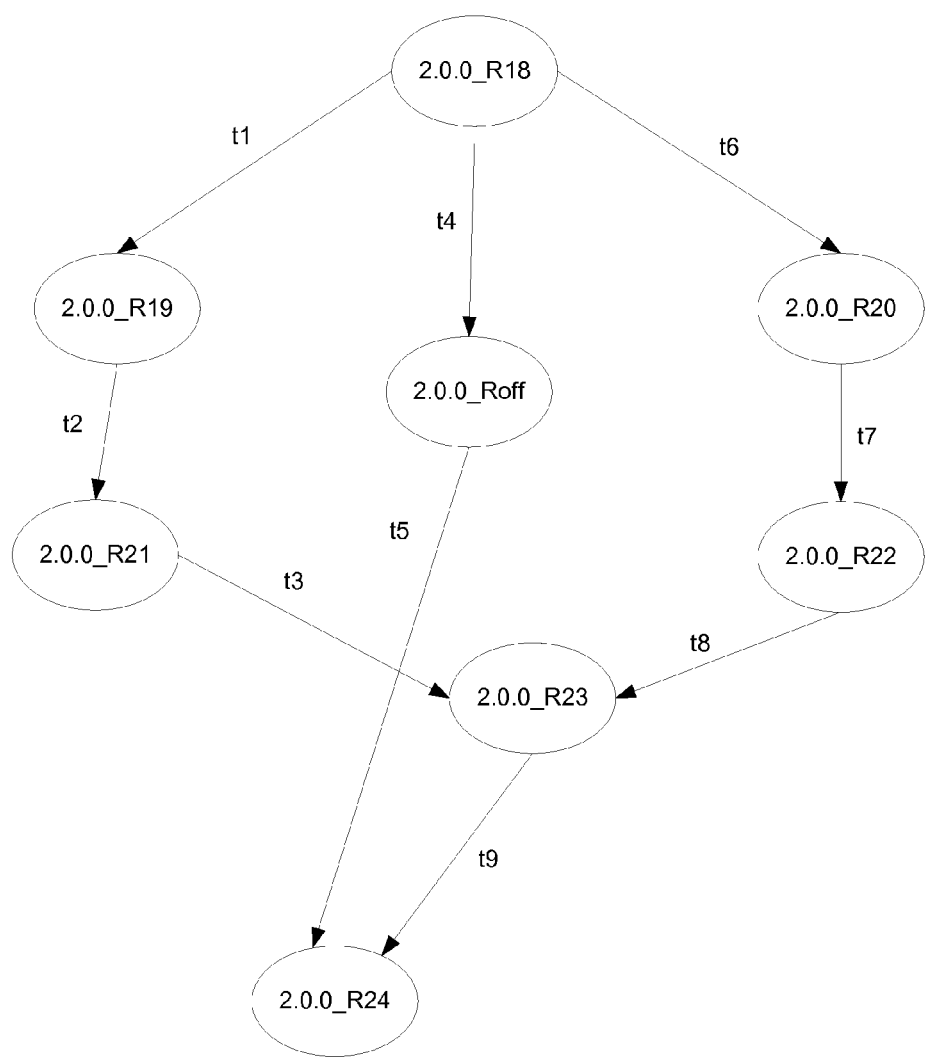
FIG. 20 is a diagram of a translation graph.

The map list uniquely maps a content based key to a database version. In one embodiment, the content based key is a hash value, such as an MD5 sum, of the database schema. In the example shown, the first mapping is from version "2.0.0-R18" to key "2bf689e0aa69ab0663147908250cacc0". The key was obtained by taking a hash of the version "2.0.0-R18" database schema. Using the map list, the database version can be determined and the appropriate translation graph can be constructed. FIG. 20 is a diagram of a translation graph. A translation graph describes the available paths that may be used to translate a database from one version to another version. In this example, the translation graph shows the available paths that may be used to translate a database from version "2.0.0_R18" to version "2.0.0_R24". ("2.0.0_Roff" might be a special release created for a particular customer.) For example, translations t1, t2, t3, t9, translations t4, t5, or translations t6, t7, t8, t9 may be applied to translate the database from version 2.0.0_R18 to version 2.0.0_R24. In one embodiment, for each translation step t1-t9, there is an MDXML file that describes the translation. Thus, if there is an MDXML file available for a particular translation, that translation is available for use as a step in a translation path.

Returning to FIG. 19, a translation path is selected (1904). For example, the shortest path (e.g., t4, t5) or the first path found (e.g., t1, t2, t3, t9) may be selected. The appropriate translation steps in the path are applied to the database (1906). For example, if the shortest path was selected in step 1904, the MDXML file for t4 and the MDXML file for t5 would be used to translate the database, as more fully described below.

Figure 21:
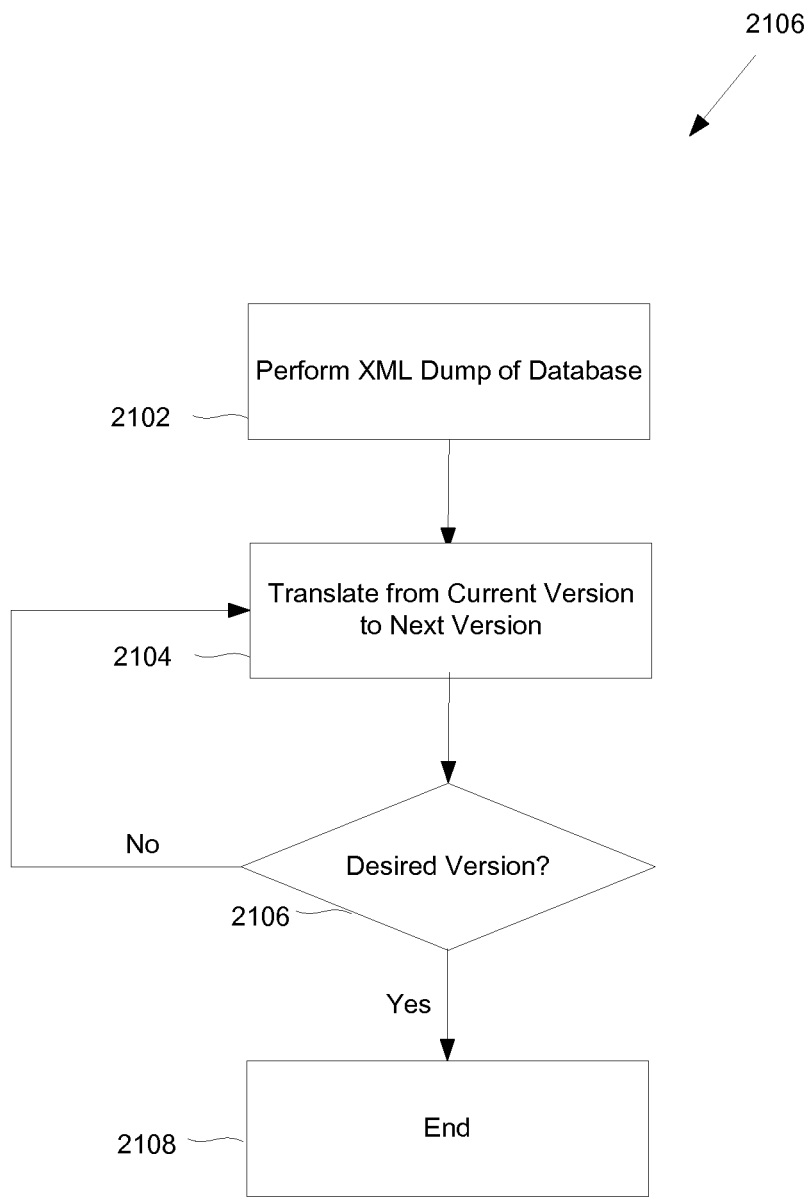
FIG. 21 is a flowchart illustrating a method of applying translation steps to arrive at a desired database version.

FIG. 21 is a flowchart illustrating a method of applying translation steps to arrive at a desired database version. In one embodiment, this method is used to perform step 1906 of FIG. 19. In this example, an XML dump of the database is performed (2102). For example, the database could be a relational, object-oriented, or any other type of database. That database would be dumped into an XML file, e.g., formatted similarly to the file shown in Example 1. In one embodiment, the database is already described in XML. The database is translated from the current version to the next version (2104) using the appropriate MDXML file. In one embodiment, the MDXML file is parsed into in memory structures based on the type of structure, e.g., there is one in memory structure describing the translations for each type of structure. It is determined whether the database version is the desired version (2106). If the database version is the desired version, the process ends (2108). If the database version is not the desired database version, the process returns to step 2104 in which the database is translated from the current version to the next version using the appropriate MDXML file. For example, if the next step is to perform translation t2 in FIG. 4, "t2.mdxml" is used. In this example, the database is translated from one version to another incrementally, i.e., the database is translated one version at a time until the desired version is reached. In one embodiment, each time a new database version is released, an MDXML file is released to describe the incremental translation from the previous version.

Figure 22:
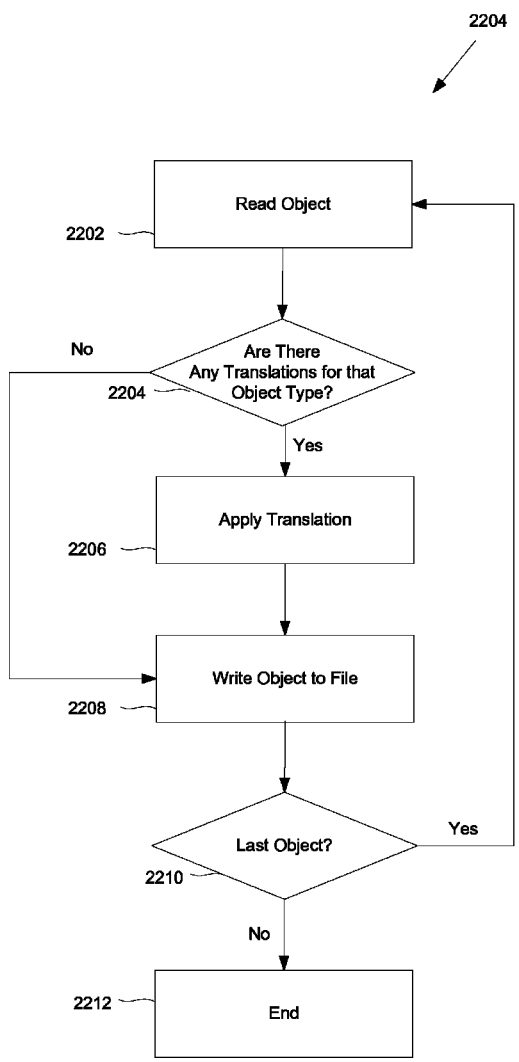
FIG. 22 is a flowchart illustrating a method of translating a database from one version to the next version.

FIG. 22 is a flowchart illustrating a method of translating a database from one version to the next version. In one embodiment, this process is used to perform step 2104 of FIG. 21. In this example, the first object is read (2202). In one embodiment, the first object in an XML file representing a database is read. For example, returning to Example 1, the first object read would be the node object with name "127.0.0.1" and type ".com.infoblox.one.node". It is determined whether there are any translations for that object type. For example, if the object is a node object, it is determined whether there are any translations for the node object. In some embodiments, the in memory structures of the MDXML file parsed in step 2104 are consulted for translations corresponding to the object. For example, if the MDXML file looked like Example 2, it would be determined that there are translations for the node object, as the structure transform shown is for an object (or structure) of type node (".com.infoblox.one.node"). If it is determined that there are translation(s) for that object type, the translation is applied to the object (2206). For example, if the structure transform for objects of type node shown in Example 2 is applied to the node object shown in Example 1, the resulting object would look like the node structure shown in Example 3. The resulting object is written to a file (2208), e.g., tmp.xml. It is determined whether the object is the last object in the database XML file (2210). If the object is the last object, the process ends (2212). If the object is not the last object, the process returns to step 2202 and the next object is read. Returning to step 2204, if there are no translations for that object type, the object is written to the file (2208) and the process continues as described above. The resulting file (e.g., tmp.xml) is the XML file associated with the translated database. The resulting file may be used to generate the new database, such as an object oriented or relational database. In some embodiments, rather than translating one object at a time, objects are translated in groups.

In addition to database migration, the system and methods described herein may also be used for other purposes. For example, in one embodiment the techniques described above are used to manage a database cluster having multiple versions of a database.

Figure 23:
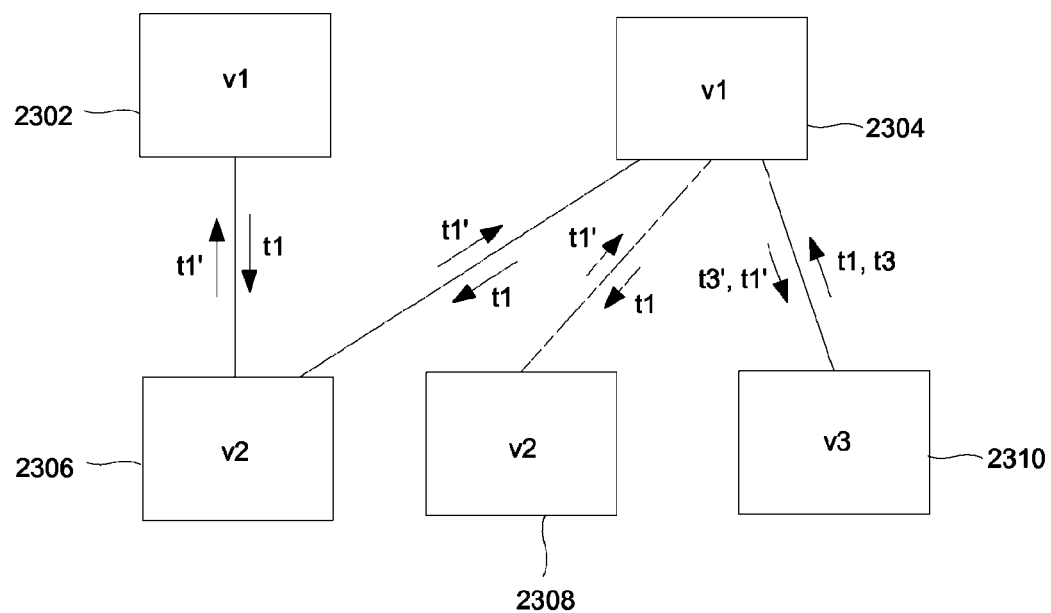
FIG. 23 is a block diagram illustrating a system used in one embodiment to manage a database cluster having multiple database versions.

FIG. 23 is a block diagram illustrating a system used in one embodiment to manage a database cluster having multiple database versions. In this example, the system includes five databases 2302-2310. Databases 2302 and 2304 have version 1 software. Databases 2306 and 2308 have version 2 software, and database 2310 has version 3 software. Such a scenario, in which multiple database versions exist within a cluster, can occur during a system upgrade process. For example, rather than upgrading all the databases to the latest version at once, the databases may be migrated one at a time. In one embodiment, databases 2302-2310 serve as backups of each other. If one database fails, there are four remaining backup databases that are available. All the databases would need to fail before the cluster failed. If any one of databases 2302-2310 is updated, the other databases would also need to be updated.

t1 represents the translation from version 1 to version 2. t1' represents the translation from version 2 to version 1. t3 represents the translation from version 2 to version 3. t3' represents the translation from version 3 to version 2. For example, an update sent from database 2302 to database 2306 would be translated using t1. An update from sent from database 2306 to database 2304 would be translated using t1'. An update sent from database 2304 to database 2308 would be translated using t1. An update sent from database 2304 to database 2310 would be translated using t1 and t3. Each of translations t1, t1', t3, and t3' may be described by an XML file, such as an MDXML file.

Figure 24:
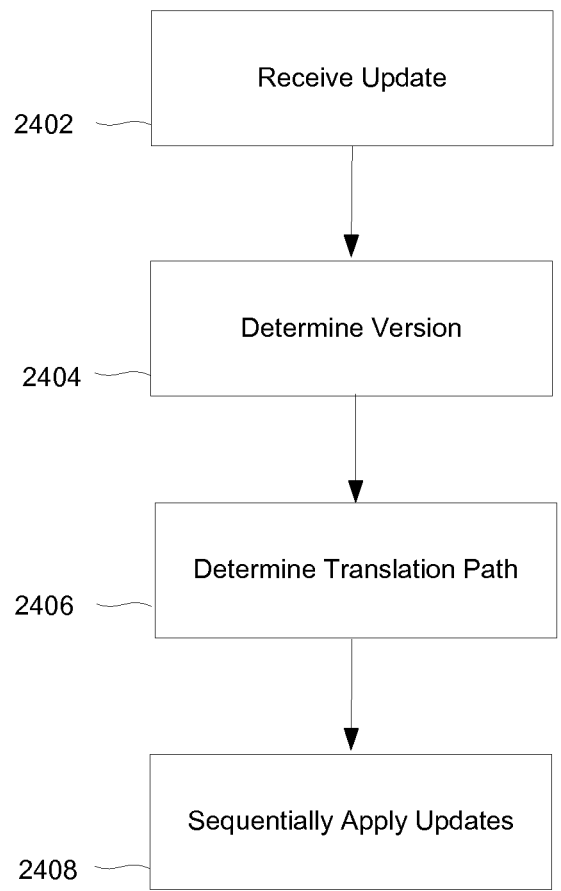
FIG. 24 is a flowchart illustrating a method of propagating an update from a first database to a second database with a different version.

FIG. 24 is a flowchart illustrating a method of propagating an update from a first database to a second database with a different version. In this example, an update is received (2402). For example, an update is received at database 2302 in FIG. 23. The update could be any write request, such as update, delete, or insert. The version of the database is determined (2404). For example, a content based key, such as a hash value, is generated based on the first database schema. A map list can be consulted to determine the version of the database from the content based key, as described above. A translation path is determined (2406). In one embodiment, a translation graph is consulted to determine the translation path. For example, to propagate an update from database 2304 (version 1) to database 2310 (version 3), there may be two available translation paths: t1, t3 or t2, t4. The translation path may be determined based on any appropriate criteria, such as the shortest path or the first path found. The translation path may be predetermined. For example, translation path t1, t3 may be the predetermined path; that is, when an update is received at database 2310, translation path t1, t3 is automatically used to translate the update. In some embodiments, the translation occurs at database 2304. For example, a translation from v2 to v1 may occur at database 2304. The updates are sequentially applied (2408). For example, t1 is applied followed by t3 if translation path t1, t3 is selected. Similarly, the update could be propagated to the other databases in the cluster.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of writing data in a distributed database having a plurality of nodes, comprising:
   receiving a write request at a first member node having a first version of a database;
   applying the received original write request to both the first version of the database and a journal queue in a single atomic transaction using a processor, comprising:
      placing the received write request in the journal, queue of the first member node, wherein the journal queue is associated with the first member node and is configured to store write requests that have not yet been reconciled with a master version of the database on a master node;
   propagating one or more items in the journal queue to the master node;
   determining whether a conflict exists between the first version of the database with the write request applied and a master version of the database;
   in the event that a conflict exists, reconciling a write request with the master version of the database; and
   in the event that a conflict does not exist:
      determining that the first version of the database is in a high availability pair, wherein the high availability pair includes a second version of the database in a second member node; and
      applying the received original write request to both the first version of the database and to the second version of the database in the second member node.

2. The method of claim 1, wherein the write request comprises a semantically expressed request to modify the database without sending changed data.

3. The method of claim 1, wherein the write request includes one or more selected from the group consisting of commands, operations, and instructions.

4. The method of claim 1, wherein the first member node is an active node and the second member node is a passive node in the high availability pair.

5. The method of claim 1, wherein the second member node is associated with a second journal queue and further including applying the write request to the second version of the database and to the second journal queue in a single atomic transaction.

6. The method of claim 1, further comprising:
   receiving from the master node an indication that the one or more items in the journal queue have been reconciled with the master version of the database by the master node.

7. The method of claim 1, further comprising:
   receiving from the master node an indication that the one or more items in the journal queue have been reconciled with the master version of the database by the master node; and
   in response to receiving the indication, removing the one or more items from the journal queue.

8. The method of claim 1, further comprising:
   receiving from the master node an indication that the one or more items in the journal queue have been reconciled with the master version of the database by the master node, wherein the indication indicates whether data in the master version of the database conflicts with the one or more items in the journal queue.

9. The method of claim 1, further comprising:
receiving from the master node an indication that the one or more items in the journal queue have been reconciled with the master version of the database by the master node; and
in the event that the indication indicates a conflict between data in the master version of the database and the one or more items in the journal queue, resolving the conflict.

10. The method of claim 1, further comprising:
receiving from the master node an indication that the one or more items in the journal queue have been reconciled with the master version of the database by the master node; and
in the event that the indication indicates a conflict between data in the master version of the database and the one or more items in the journal queue, resolving the conflict, wherein removing the one or more items from the journal queue and resolving the conflict are performed in a single atomic transaction.

11. A computer program product for writing data in a distributed database having a plurality of nodes, the computer program product being embodied in a tangible computer readable storage medium and comprising computer instructions for:
receiving a write request at a first member node having a first version of a database;
applying the received original write request to both the first version of the database and a journal queue in a single atomic transaction, comprising:
placing the write request in the journal, queue of the first member node, wherein the journal queue is associated with the first member node and is configured to store write requests that have not yet been reconciled with a master version of the database on a master node;
propagating one or more items in the journal queue to the master node;
determining whether a conflict exists between the first version of the database with the write request applied and a master version of the database;
in the event that a conflict exists, reconciling a write request with the master version of the database; and
in the event that a conflict does not exist:
determining that the first version of the database is in a high availability pair, wherein the high availability pair includes a second version of the database in a second member node; and
applying the received original write request to both the first version of the database and to the second version of the database in the second member node.

12. The computer program product recited in claim 11, wherein the write request comprises a semantically expressed request to modify the database without sending changed data.

13. The computer program product recited in claim 11, wherein the write request includes one or more selected from the group consisting of commands, operations, and instructions.

14. The computer program product recited in claim 11, wherein the first member node is an active node and the second member node is a passive node in the high availability pair.

15. The computer program product recited in claim 11, wherein the second member node is associated with a second journal queue and further including applying the write request to the second version of the database and to the second journal queue in a single atomic transaction.

16. The computer program product recited in claim 11, further comprising computer instructions for:
receiving from the master node an indication that the one or more items in the journal queue have been reconciled with the master version of the database by the master node.

17. The computer program product recited in claim 11, further comprising computer instructions for:
receiving from the master node an indication that the one or more items in the journal queue have been reconciled with the master version of the database by the master node; and
in response to receiving the indication, removing the one or more items from the journal queue.

18. The computer program product recited in claim 11, further comprising computer instructions for:
receiving from the master node an indication that the one or more items in the journal queue have been reconciled with the master version of the database by the master node, wherein the indication indicates whether data in the master version of the database conflicts with the one or more items in the journal queue.

19. The computer program product recited in claim 11, further comprising computer instructions for:
receiving from the master node an indication that the one or more items in the journal queue have been reconciled with the master version of the database by the master node; and
in the event that the indication indicates a conflict between data in the master version of the database and the one or more items in the journal queue, resolving the conflict.

20. The computer program product recited in claim 11, further comprising computer instructions for:
receiving from the master node an indication that the one or more items in the journal queue have been reconciled with the master version of the database by the master node; and
in the event that the indication indicates a conflict between data in the master version of the database and the one or more items in the journal queue, resolving the conflict, wherein removing the one or more items from the journal queue and resolving the conflict are performed in a single atomic transaction.

21. A system for writing data in a distributed database having a plurality of nodes, including:
a processor configured to:
receive a write request at a first member node having a first version of a database;
apply the received original write request to both the first version of the database and a journal queue in a single atomic transaction, comprising to:
place the write request in the journal, queue of the first member node, wherein the journal queue is associated with the first member node and is configured to store write requests that have not yet been reconciled with a master version of the database on a master node;
propagate one or more items in the journal queue to the master node;
determine whether a conflict exists between the first version of the database with the write request applied and a master version of the database;
in the event that a conflict exists, reconcile write request with the master version of the database; and
in the event that a conflict does not exist:
determine that the first version of the database is in a high availability pair, wherein the high availability pair includes a second version of the database in a second member node; and apply the received original write request to both the first version of the database and to the second version of the database in the second member node; and a memory coupled to the processor and configured to provide the processor with instructions.

22. The system recited in claim 21, wherein the write request comprises a semantically expressed request to modify the database without sending changed data.

23. The system recited in claim 21, wherein the write request includes one or more selected from the group consisting of commands, operations and instructions.

24. The system recited in claim 21, wherein the first member node is an active node and the second member node is a passive node in the high availability pair.

25. The system recited in claim 21, wherein the second member node is associated with a second journal queue and further including applying the write request to the second version of the database and to the second journal queue in a single atomic transaction.

26. The system recited in claim 21, wherein the processor is further configured to:

receive from the master node an indication that the one or more items in the journal queue have been reconciled with the master version of the database by the master node.

27. The system recited in claim 21, wherein the processor is further configured to:

receive from the master node an indication that the one or more items in the journal queue have been reconciled with the master version of the database by the master node; and in response to receiving the indication, remove the one or more items from the journal queue.

28. The system recited in claim 21, wherein the processor is further configured to:

receive from the master node an indication that the one or more items in the journal queue have been reconciled with the master version of the database by the master node, wherein the indication indicates whether data in the master version of the database conflicts with the one or more items in the journal queue.

29. The system recited in claim 21, wherein the processor is further configured to:

receive from the master node an indication that the one or more items in the journal queue have been reconciled with the master version of the database by the master node; and in the event that the indication indicates a conflict between data in the master version of the database and the one or more items in the journal queue, resolve the conflict.

30. The system recited in claim 21, wherein the processor is further configured to:

receive from the master node an indication that the one or more items in the journal queue have been reconciled with the master version of the database by the master node; and in the event that the indication indicates a conflict between data in the master version of the database and the one or more items in the journal queue, resolve the conflict, wherein removing the one or more items from the journal queue and resolving the conflict are performed in a single atomic transaction.

* * * * *

UNITED STATES PATENT AND TRADEMARK OFFICE
CERTIFICATE OF CORRECTION

| | |
|---|---|
| PATENT NO. | : 9,317,545 B2 |
| APPLICATION NO. | : 13/955487 |
| DATED | : April 19, 2016 |
| INVENTOR(S) | : Bailey et al. |

It is certified that error appears in the above-identified patent and that said Letters Patent is hereby corrected as shown below:

Claims

In column 26, line 61, claim 21, after "conflict exists, reconcile", insert --a--.

Signed and Sealed this
Twenty-third Day of August, 2016

Michelle K. Lee
*Director of the United States Patent and Trademark Office*